(12) United States Patent
Kim et al.

(10) Patent No.: US 11,930,534 B2
(45) Date of Patent: Mar. 12, 2024

(54) METHOD AND DEVICE FOR LOW LATENCY COMMUNICATION IN COMMUNICATION SYSTEM

(71) Applicant: Electronics and Telecommunications Research Institute, Daejeon (KR)

(72) Inventors: Eunkyung Kim, Daejeon (KR); Tae Joong Kim, Daejeon (KR); Hyun Seo Park, Daejeon (KR); An Seok Lee, Daejeon (KR); Yu Ro Lee, Daejeon (KR); Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/963,747

(22) PCT Filed: Apr. 10, 2019

(86) PCT No.: PCT/KR2019/004272
§ 371 (c)(1),
(2) Date: Jul. 21, 2020

(87) PCT Pub. No.: WO2019/199051
PCT Pub. Date: Oct. 17, 2019

(65) Prior Publication Data
US 2021/0100036 A1 Apr. 1, 2021

(30) Foreign Application Priority Data

Apr. 11, 2018 (KR) .......................... 10-2018-0042119
May 11, 2018 (KR) .......................... 10-2018-0054456
(Continued)

(51) Int. Cl.
*H04W 74/08* (2009.01)
*H04L 1/18* (2023.01)

(52) U.S. Cl.
CPC ........... *H04W 74/0833* (2013.01); *H04L 1/18* (2013.01)

(58) Field of Classification Search
CPC ........... H04W 74/0833; H04W 74/002; H04W 74/004; H04W 74/006; H04W 72/0406;
(Continued)

(56) References Cited

U.S. PATENT DOCUMENTS

2012/0076126 A1* 3/2012 Yi ........................ H04W 74/085
370/338
2014/0219204 A1* 8/2014 Park ...................... H04L 1/1822
370/329
(Continued)

FOREIGN PATENT DOCUMENTS

| KR | 1020170089962 A | 8/2017 |
|---|---|---|
| KR | 1020180006840 A | 1/2018 |
| WO | 2015009043 A1 | 1/2015 |
| WO | 2018062961 A1 | 4/2018 |

OTHER PUBLICATIONS

Discussion on PDCCH repetition for URLLC, 3GPP TSG RAN WG1 Meeting #92bis, R1-1803802, Apr. 16-20, 2018, ZTE, Sanechips, Sanya, China.
(Continued)

*Primary Examiner* — Peter Chen
(74) *Attorney, Agent, or Firm* — William Park & Associates Ltd.

(57) ABSTRACT

Disclosed are a method and a device for low latency communication in a communication system. An operation method of a base station comprises the steps of: transmitting first scheduling information of data units, transmitted through A sections in subframe #n, to a terminal through a first control channel in subframe #n; transmitting the data units to the terminal through the A sections; and transmitting second scheduling information of data unit(s), transmitted
(Continued)

through B section(s) in subframe #(n+k) following subframe #n, to the terminal through a second control channel in subframe #(n+k). Therefore, the performance of the communication system can be improved.

7 Claims, 34 Drawing Sheets

(30) Foreign Application Priority Data

| | | |
|---|---|---|
| Nov. 26, 2018 | (KR) | 10-2018-0147844 |
| Jan. 10, 2019 | (KR) | 10-2019-0003301 |
| Feb. 7, 2019 | (KR) | 10-2019-0014534 |
| Feb. 21, 2019 | (KR) | 10-2019-0020692 |
| Mar. 22, 2019 | (KR) | 10-2019-0033210 |

(58) Field of Classification Search
CPC ........... H04W 72/0413; H04W 72/042; H04W 56/0045; H04W 56/0005; H04W 76/27; H04W 28/02; H04W 88/02; H04L 5/0048; H04L 5/0055; H04L 5/0064; H04L 1/18; H04L 1/1812; H04L 1/189; H04L 1/1845

See application file for complete search history.

(56) References Cited

U.S. PATENT DOCUMENTS

| | | |
|---|---|---|
| 2015/0223213 A1 | 8/2015 | Moon et al. |
| 2016/0183294 A1 | 6/2016 | Noh et al. |
| 2016/0323070 A1* | 11/2016 | Chen ............... H04W 56/0045 |
| 2017/0251464 A1 | 8/2017 | Mukherjee |
| 2017/0257190 A1 | 9/2017 | Wang et al. |
| 2018/0026744 A1 | 1/2018 | Lyu et al. |
| 2018/0041325 A1 | 2/2018 | Lee et al. |
| 2018/0070341 A1 | 3/2018 | Islam et al. |
| 2018/0145818 A1 | 5/2018 | Choi et al. |
| 2018/0279376 A1* | 9/2018 | Dinan ............... H04W 74/0833 |
| 2019/0028923 A1* | 1/2019 | Futaki ....................... H04L 1/08 |
| 2019/0327768 A1 | 10/2019 | Kim et al. |
| 2019/0393992 A1* | 12/2019 | Xiong ................. H04L 5/0007 |
| 2021/0160917 A1* | 5/2021 | Goto ................. H04W 72/0446 |

OTHER PUBLICATIONS

PDSCH reliability for URLLC, 3GPP TSG RAN WG1 Ad Hoc Meeting, R1-1800058, Jan. 22-26, 2018, Huawei, HiSilicon, Vancouver, Canada.

Summary of remaining issues on UL data transmission procedure, 3GPP TSG RAN WG1 Meeting #92bis, R1-1804295, Apr. 16-Apr. 20, 2018, Huawei, HiSilicon, Sanya, China.

* cited by examiner

— : LATENCY PATH OF INDIRECT RADIO TRANSMISSION
⋯ : INDIRECT RADIO SECTION
— : LATENCY PATH OF DIRECT RADIO TRANSMISSION
⋯ : DIRECT RADIO SECTION
--- : LATENCY PATH IN APPLICATION PROCESSING

FIG. 15

<u>Downlink multiple transmission method with early feedback (terminal operation)</u>
1. If FEC(I) succeeds then
2.     feeds ACK back in resource (e.g., time resource) for feedback of I, II, III, and IV
3.     FEC for II, III, and IV may be skipped
4. else if FEC(I) fails then
5.     feeds NACK back or no feedback in resource (e.g., time resource) for feedback of I
6.     if FEC with combining I and II succeeds then
7.         feeds ACK back in resource (e.g., time resource) for feedback of II, III, and IV
8.     else if FEC with combining I and II fails then
9.         feeds NACK back or no feedback in resource (e.g., time resource) for feedback of II
10.        if FEC with combining I, II, and III succeeds then
11.            feeds ACK back in resource (e.g., time resource) for feedback of III and IV
12.        else if FEC with combining I, II, and III fails then
13.            feeds NACK back or no feedback in resource (e.g., time resource) for feedback of III and IV
14.            if FEC with combining I, II, III, and IV succeeds then
15.                feeds ACK back in resource (e.g., time resource) for feedback of IV
16.            else if FEC with combining I, II, III, and IV fails then
17.                feeds NACK back or no feedback in resource (e.g., time resource) for feedback of IV In 2, ACK feedback may be skipped in resource (e.g., time resource) for feedback of II, III, and IV
In 7, ACK feedback may be skipped in resource (e.g., time resource) for feedback of III and IV
In 11, ACK feedback may be skipped in resource (e.g., time resource) for feedback of IV

FIG. 24

| Uplink multiple resource allocation method with early re-allocation (base station operation) |
|---|

1. if FEC(I) succeeds then
2.    indicates allocation of resource for new data (*) or termination of resource (re)allocation (+ACK)
3.    FEC for II, III, and IV may be skipped
4. else if FEC(I) fails then
5.    Resource (re)allocation (#) in resource (e.g., time resource) for I (+NACK)
6.    if FEC with combining I and II succeeds then
7.       Indicates allocation of resource for new data (*) or termination of resource (re)allocation (+ACK)
8.       FEC for III and IV may be skipped
9.    else if FEC with combining I and II fails then
10.       Resource (re)allocation (#) in resource (e.g., time resource) for II (+NACK)
11.       if FEC with combining I, II, and III succeeds then
12.          Indicates allocation of resource for new data (*) or termination of resource (re)allocation (+ACK)
13.          FEC for IV may be skipped
14.       else if FEC with combining I, II, and III fails then
15.          Resource (re)allocation (#) in resource (e.g., time resource) for III (+NACK)
16.          if FEC with combining I, II, III, and IV succeeds then
17.             Indicates allocation of resource for new data (*) or termination of resource (re) allocation (+ACK)
18.          else if FEC with combining I, II, III, and IV fails then
19.             Resource (re)allocation (#) in resource (e.g., time resource) for IV (+NACK)

(*): When resource is already allocated before the data transmission procedure is terminated by the base station or when resource for new data is allocated, terminal may transmit new data, and base station may indicate with ACK.

(#): Base station may 1) allocate a retransmission resource without NACK or perform DTX to indicate retransmission based on previous allocation information. When NACK or DTX is identified, terminal may retransmit data based on previous allocation information.

METHOD AND DEVICE FOR LOW LATENCY COMMUNICATION IN COMMUNICATION SYSTEM

TECHNICAL FIELD

The present invention relates to techniques of low latency communication in a communication system, and more particularly, to techniques of communication for preventing data transmission latency and securing data transmission reliability.

BACKGROUND ART

With the development of information and communication technology, various wireless communication technologies have been developed. Typical wireless communication technologies include long term evolution (LTE) and new radio (NR), which are defined in the $3^{rd}$ generation partnership project (3GPP) standards. The LTE may be one of $4^{th}$ generation (4G) wireless communication technologies, and the NR may be one of $5^{th}$ generation (5G) wireless communication technologies.

In order to process soaring wireless data after commercialization of the 4G communication system (e.g., communication system supporting the LTE), the 5G communication system (e.g., communication system supporting the NR) using a frequency band (e.g., frequency band of 6 GHz or above) higher than a frequency band (e.g., frequency band of 6 GHz or below) of the 4G communication system as well as the frequency band of the 4G communication system is being considered. The 5G communication system can support enhanced mobile broadband (eMBB), ultra-reliable low-latency communication (URLLC), massive machine type communication (mMTC), and the like.

There is a need for methods for improving the quality of communication services as the number of users of the communication system increases. In order to improve the quality of communication services, it is required to reduce transmission latency, improve reliability through improvement of (re)transmission performance of data, provide communication services having flexibility and expandability by considering the characteristics of the terminal and the characteristics of the communication services, provide communication services reflecting frequency operation regulations and frequency characteristics, and transmit high-speed data (or high-capacity data) according to a user's request. In particular, communication methods for preventing data transmission latency and securing data transmission reliability will be required.

DISCLOSURE

Technical Problem

An objective of the present invention for solving the above-described problem is directed to providing a method and an apparatus for low latency communication in a communication system.

Technical Solution

An operation method of a base station, according to a first exemplary embodiment of the present invention for achieving the above-described objective, may comprise transmitting first scheduling information of data units to be transmitted through A durations within a subframe #n to a terminal through a first control channel within the subframe #n; transmitting the data units to the terminal through the A durations; and transmitting second scheduling information of data unit(s) to be transmitted through B duration(s) within a subframe #(n+k) after the subframe #n to the terminal through a second control channel within the subframe #(n+k), wherein n is an integer equal to or greater than 0, k is an integer equal to or greater than 1, and the second scheduling information is transmitted when a negative acknowledgement (NACK) for at least one data unit among the data units transmitted through the A durations is received from the terminal.

The operation method may further comprise retransmitting the at least one data unit to the terminal through the B duration(s) when a NACK corresponding to one data unit among the data units transmitted through the A durations is received, wherein remaining data units excluding the one data unit among the data units transmitted through the A durations may not be transmitted through the B duration(s).

The operation method may further comprise, when the A durations include an A duration #1 and an A duration #2, a data unit #1 is transmitted through the A duration #1, a data unit #2 is transmitted through the A duration #2, and a NACK corresponding to the data unit #1 is received, transmitting the data unit #1 to the terminal through a B duration #1 within the B duration(s); and retransmitting the data unit #2 to the terminal through a B duration #2 within the B duration(s).

The operation method may further comprise, when the A durations include an A duration #1 and an A duration #2, a data unit #1 is transmitted through the A duration #1, a data unit #2 is transmitted through the A duration #2, an ACK corresponding to the data unit #1 is received, and a NACK corresponding to the data unit #2 is received, transmitting new data to the terminal through a B duration #1 within the B duration(s); and retransmitting the data unit #2 to the terminal through a B duration #2 within the B duration(s).

The operation method may further comprise, when the A durations include an A duration #1 and an A duration #2, a data unit #1 is transmitted through the A duration #1, a data unit #2 is transmitted through the A duration #2, an ACK corresponding to the data unit #1 is received, and a NACK corresponding to the data unit #2 is received, retransmitting the data unit #2 to the terminal through a B duration #1 within the B duration(s); and retransmitting the data unit #2 to the terminal through a B duration #2 within the B duration(s).

The data units transmitted through the A durations may include same data having same or different redundancy versions (RVs).

The data units transmitted through the A durations may include different data.

Each of the A durations and the B duration(s) may be composed of a plurality of symbols.

The A durations may be allocated continuously in time domain.

An operation method of a terminal, according to a second exemplary embodiment of the present invention for achieving the above-described objective, may comprise receiving first scheduling information from a base station through a first control channel within a subframe #n; receiving data units from the terminal through A durations within the subframe #n indicated by the first scheduling information; transmitting hybrid automatic repeat request (HARQ) responses for the data units to the base station; receiving second scheduling information from the base station through a second control channel within a subframe #(n+k) after the subframe #n; and receiving data unit(s) from the base station through B duration(s) within the subframe #(n+k) indicated by the second scheduling information, wherein n is an integer equal to or greater than 0, k is an integer equal to or greater than 1, and the second scheduling information is received before a decoding completion time of at least one HARQ response among the HARQ responses at the base station.

The operation method may further comprise, when a negative acknowledgement (NACK) for one data unit among the HARQ responses is received from the base station, receiving the one data unit from the base station through the B duration(s), wherein remaining data units excluding the one data unit among the data units received through the A durations may not be received through the B duration(s).

The operation method may further comprise, when the A durations include an A duration #1 and an A duration #2, a data unit #1 is received through the A duration #1, a data unit #2 is received through the A duration #2, and a NACK corresponding to the data unit #1 among the HARQ responses is received at the base station, receiving the data unit #1 from the base station through a B duration #1 within the B duration(s); and receiving the data unit #2 from the base station through a B duration #2 within the B duration(s).

The operation method may further comprise, when the A durations include an A duration #1 and an A duration #2, a data unit #1 is received through the A duration #1, a data unit #2 is received through the A duration #2, an ACK corresponding to the data unit #1 is transmitted, and a NACK corresponding to the data unit #2 is transmitted, receiving new data from the base station through a B duration #1 within the B duration(s); and receiving the data unit #2 from the base station through a B duration #2 within the B duration(s).

The operation method may further comprise, when the A durations include an A duration #1 and an A duration #2, a data unit #1 is received through the A duration #1, a data unit #2 is received through the A duration #2, an ACK corresponding to the data unit #1 is transmitted, and a NACK corresponding to the data unit #2 is transmitted, receiving the data unit #2 from the base station through a B duration #1 within the B duration(s); and receiving the data unit #2 from the base station through a B duration #2 within the B duration(s).

The data units received through the A durations may include same data having same or different redundancy versions (RVs), and each of the A durations and the B duration(s) may be composed of a plurality of symbols.

A terminal, according to a third exemplary embodiment of the present invention for achieving the above-described objective, may comprise a processor; and a memory in which at least one instruction executable by the processor is stored, wherein when executed by the processor, the at least one instruction may cause the processor to: receive first scheduling information from a base station through a first control channel within a subframe #n; receive data units from the terminal through A durations within the subframe #n indicated by the first scheduling information; transmit hybrid automatic repeat request (HARQ) responses for the data units to the base station; receive second scheduling information from the base station through a second control channel within a subframe #(n+k) after the subframe #n; and receive data unit(s) from the base station through B duration(s) within the subframe #(n+k) indicated by the second scheduling information, wherein n is an integer equal to or greater than 0, k is an integer equal to or greater than 1, and the second scheduling information is received before a decoding completion time of at least one HARQ response among the HARQ responses at the base station.

The at least one instruction may further cause the processor to, when a negative acknowledgement (NACK) corresponding to one data unit among the HARQ responses is received from the base station, receive the one data unit from the base station through the B duration(s), wherein remaining data units excluding the one data unit among the data units received through the A durations may not be received through the B duration(s).

The at least one instruction may further cause the processor to, when the A durations include an A duration #1 and an A duration #2, a data unit #1 is received through the A duration #1, a data unit #2 is received through the A duration #2, and a NACK corresponding to the data unit #1 among the HARQ responses is received at the base station, receive the data unit #1 from the base station through a B duration #1 within the B duration(s); and receive the data unit #2 from the base station through a B duration #2 within the B duration(s).

The at least one instruction may further cause the processor to, when the A durations include an A duration #1 and an A duration #2, a data unit #1 is received through the A duration #1, a data unit #2 is received through the A duration #2, an ACK corresponding to the data unit #1 is transmitted, and a NACK corresponding to the data unit #2 is transmitted, receive new data from the base station through a B duration #1 within the B duration(s); and receive the data unit #2 from the base station through a B duration #2 within the B duration(s).

The at least one instruction may further cause the processor to, when the A durations include an A duration #1 and an A duration #2, a data unit #1 is transmitted through the A duration #1, a data unit #2 is transmitted through the A duration #2, an ACK corresponding to the data unit #1 is transmitted, and a NACK corresponding to the data unit #2 is transmitted, receive the data unit #2 from the base station through a B duration #1 within the B duration(s); and receive the data unit #2 from the base station through a B duration #2 within the B duration(s).

Advantageous Effects

According to the present invention, the base station can transmit downlink data to the terminal, and retransmit the downlink data to the terminal by using a pre-allocated resource before receiving a hybrid automatic repeat request (HARQ) response for the downlink data. The terminal can receive the downlink data from the base station, and can receive the retransmitted downlink data from the base station before transmission of the HARQ response corresponding to the downlink data. In this case, the terminal can perform combining on two downlink data, decode the combining result, and transmit an HARQ response corresponding to the decoding result to the base station. Therefore, the retransmission latency of the data can be reduced, and the reliability of data transmission can be improved. As a result, the performance of the communication system can be improved.

DESCRIPTION OF DRAWINGS

FIG. 15 is a conceptual diagram illustrating a first exemplary embodiment of a data reception processing operation in a communication system.

FIG. 24 is a conceptual diagram illustrating a second exemplary embodiment of a data reception processing operation in a communication system.

MODES OF THE INVENTION

Figure 1:
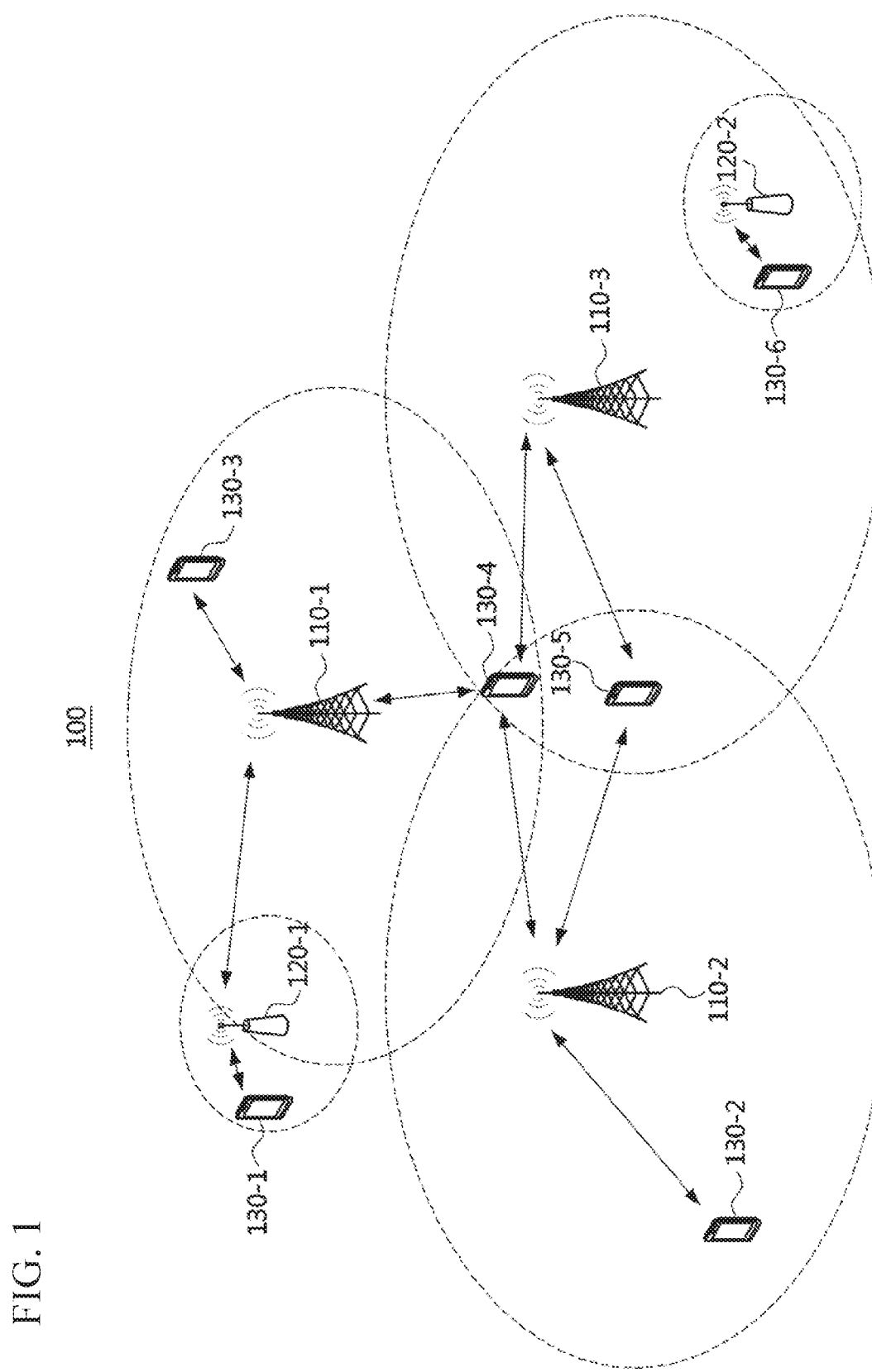
FIG. 1 is a conceptual diagram illustrating a first exemplary embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which exemplary embodiments according to the present invention will be described. However, the communication system to which exemplary embodiments according to the present invention are applied is not restricted to what will be described below. That is, the exemplary embodiments according to the present invention may be applied to various communication systems. Here, the term 'communication system' may be used in the same sense as the term 'communication network.'

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
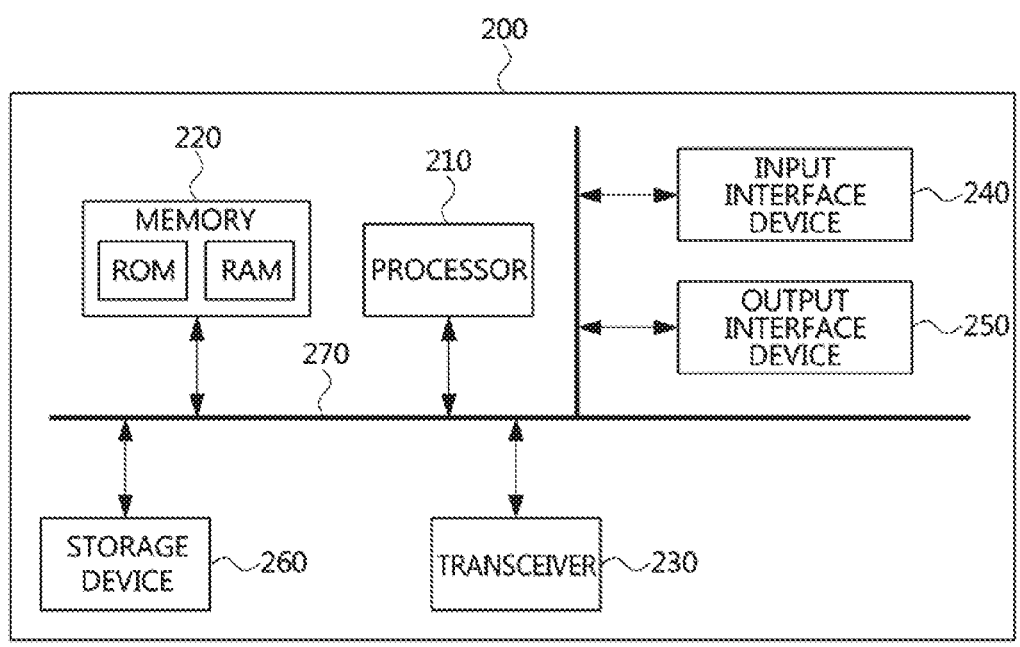
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network.' Each of the first base station 110-1, the second base station 110-2, and the third base station 110-3 may form an individual macro cell, and each of the fourth base station 120-1 and the fifth base station 120-2 may form an individual small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 1304, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and the fifth terminal 130-5 in the MU-MIMO manner, and the fourth terminal 130-4 and the fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for reducing a transmission latency in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

A communication node providing enhanced services in the following exemplary embodiments may be an enhanced mobile broadband (eMBB) device (e.g., a communication node that transmits and receives high capacity data), a low-latency enabled (LL) device (e.g., a communication node that supports a transmission latency reduction function), a coverage enhanced (CE) device (e.g., a communication node that supports an extended coverage providing function), or a low complexity (LC) device (e.g., a communication node that supports enhanced complexity).

The eMBB device, LL device, CE device, and LC device may be devices that provide improved services/reliability. The device providing improved services/reliability may be a base station, a relay, or a terminal. In addition, the device providing improved services/reliability may be mounted in a vehicle, a train, an unmanned aircraft (e.g., drone), a manned aircraft, and the like. In addition to the eMBB device, LL device, CE device, and LC device, a communication node providing reliability may perform the following exemplary embodiments.

The device providing improved services/reliability may operate as a transmitting device, a receiving device, or a relaying device. In a downlink communication procedure, a base station may operate as a transmitting device, and a terminal may operate as a receiving device. In an uplink communication procedure, the base station may operate as a receiving device, and the terminal may operate as a transmitting device.

Meanwhile, in a communication system that provides a high-capacity data service (e.g., eMBB service), a high-quality voice call service, a high-quality video call service, an accurate/quick data sharing service in a dense living space, and a high-speed data (e.g., video data) service may be provided.

In addition, the communication system may provide a real-time interaction based convergence service (e.g., low latency services or ultra-low latency services). For example, the real-time interaction based convergence service may include a vehicle-to-everything (V2X) communication service, a drone communication service, a remote medical service, an industrial Internet of Things (IoT) service, an augmented reality (AR) service, and a virtual reality (VR) service. The low-latency services may be performed as follows.

Figure 3:
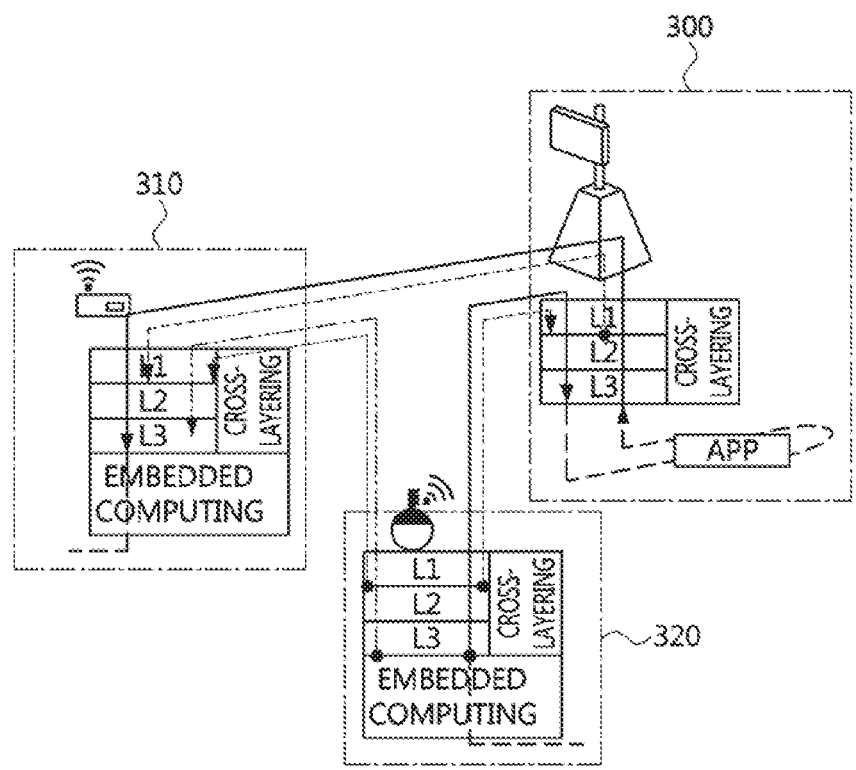
FIG. 3 is a conceptual diagram illustrating a first exemplary embodiment of a communication system supporting low-latency services.

FIG. 3 is a conceptual diagram illustrating a first exemplary embodiment of a communication system supporting low-latency services.

Referring to FIG. 3, a communication system may comprise a base station 300, a first terminal 310, and a second terminal 320. The first terminal 310 may be an actuator and the second terminal 320 may be a sensor node or a utility node. The base station 300 may include a layer 1 (L1), a layer 2 (L2), a layer 3 (L3), and an application layer (APP). The base station 300 may be connected to a mobile edge cloud (MEC) server. Cross-layering may be applied to the layers included in the base station 300. Each of the first terminal 310 and the second terminal 320 may include a layer 1 (L1), a layer 2 (L2), and a layer 3 (L3). Also, each of the first terminal 310 and the second terminal 320 may further include a layer that performs an embedded computing function. Cross-layering may be applied to the layers included in each of the first terminal 310 and the second terminal 320.

A radio transmission latency may be classified into a direct radio transmission latency and an indirect radio transmission latency. In order to support a high transmission rate, a high transmission efficiency, a short transmission latency, and a robust data transmission in communication between communication nodes (e.g., the base station 300, the first terminal 310, and the second terminal 320), a strict time latency may be required.

In the communication system that provides ultra-low-latency services, the radio transmission latency may include a transmission processing latency, a radio link latency, and a reception processing latency. The transmission processing latency may include a transmission latency (e.g., L2 processing latency) from the application layer (APP) to the layer 1 (L1) and an L1 processing latency. The reception processing latency may include an L1 processing latency and a transmission latency from the layer 1 (L1) to the application layer (APP) (e.g., L2 processing latency). The L1 processing latency may be determined based on a processing performance of a baseband and a processing performance of a radio frequency (RF).

Figure 4:
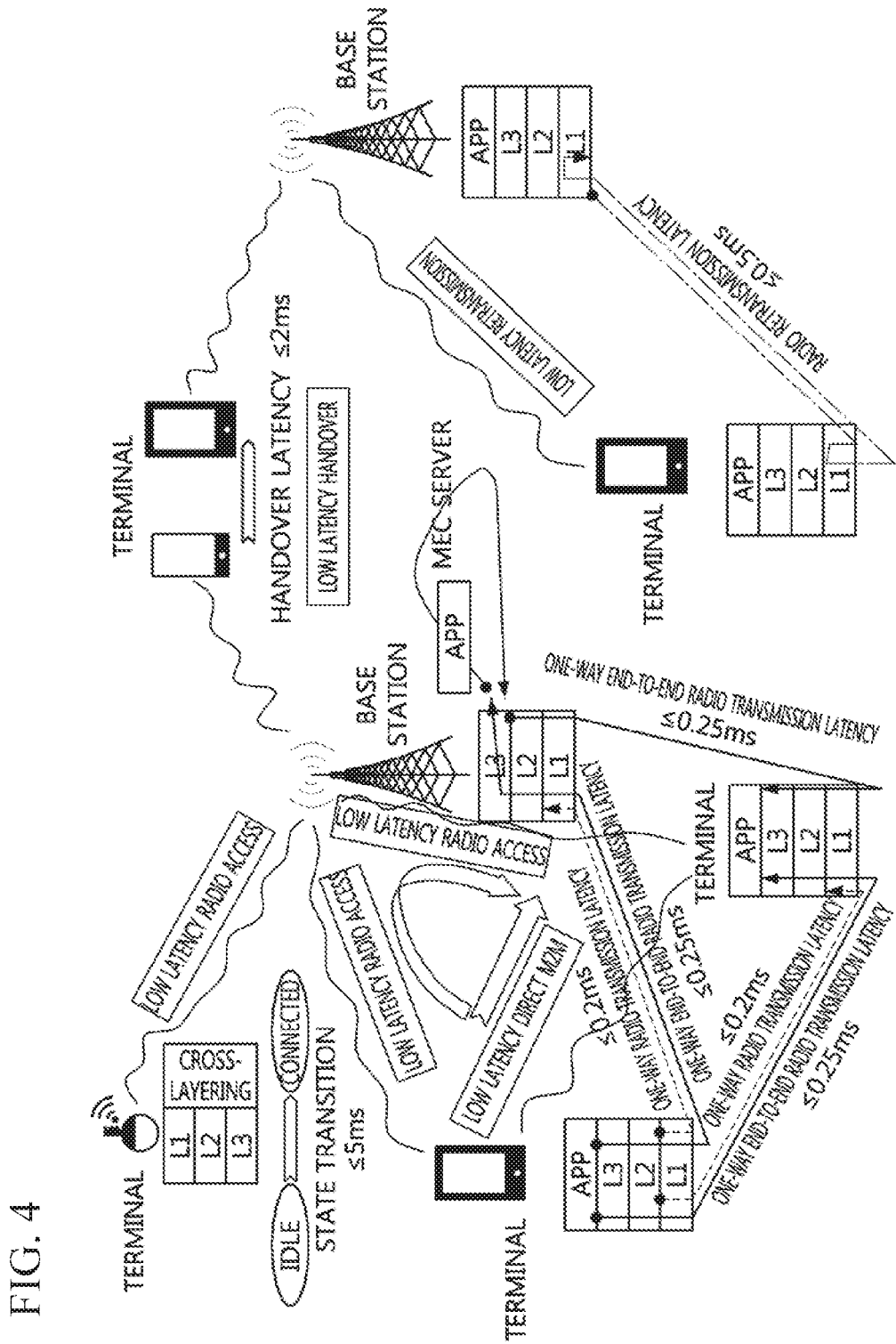
FIG. 4 is a conceptual diagram illustrating a first exemplary embodiment of a communication system supporting ultra-low-latency services.

FIG. 4 is a conceptual diagram illustrating a first exemplary embodiment of a communication system supporting ultra-low-latency services.

Referring to FIG. 4, a communication system may comprise a base station and a terminal. The base station may include a layer 1 (L1), a layer 2 (L2), a layer 3 (L3), and an application layer (APP). The base station may be connected to a MEC server. The terminal may include a layer 1 (L1), a layer 2 (L2), and a layer 3 (L3). Also, the terminal may further include an application layer (APP). Cross-layering may be applied to the layers included in the terminal.

For example, required a one-way radio transmission latency between communication nodes (e.g., base station and terminal) may be within 0.2 ms, and required a one-way end-to-end radio transmission latency between communication nodes may be within 0.25 ms. Also, required a radio retransmission latency between communication nodes may be within 0.5 ms, and required a handover latency may be within 2 ms.

The one-way radio transmission latency, the one-way end-to-end radio transmission latency, and the radio retransmission latency may be identified according to a start time and an end time of the signal processing.

One-way radio transmission latency: The one-way radio transmission latency may be a time from when data is received from a layer 2 (L2) at a transmitting end to when the data is transferred to a layer 2 (L2) at a receiving end. For example, the one-way radio transmission latency may include a layer 1 (L1) processing time (e.g., modulation processing time, encoding processing time) at the transmitting end, a transmission time through a radio link, and a layer (L1) processing time (e.g., demodulation processing time, decoding processing time) at the receiving end.

One-way end-to-end radio transmission latency: The one-way end-to-end radio transmission latency may be a time from when data is received from an application layer (APP) at a transmitting end to when the data is transferred to an application layer (APP) at a receiving end. For example, the one-way end-to-end radio transmission latency may include a layer 2/3 (L2/3) processing time (e.g., generation time of a data header) at the transmitting end, the layer 1 (L1) processing time at the transmitting end, the transmission time through a radio link, the layer 1 (L1) processing time at the receiving end, and a layer 2/3 (L2/3) processing time at the receiving end.

Radio retransmission latency: The radio retransmission latency may be a time from when data is transmitted from the layer 1 (L1) at the transmitting end to when a preparation of a retransmission based on a feedback signal (e.g., acknowledgment (ACK) or a negative ACK (NACK)) corresponding to the data is completed. For example, the radio retransmission latency may include the transmission time of the data through a radio link, the processing time of the data in the layer 1 (L1) at the receiving end, a transmission time of the feedback signal through the radio link, and a processing time of the feedback signal in the layer 1 at the transmitting end.

In order to provide ultra-low-latency services to the terminal in the communication system, a radio access latency and a handover service latency may be identified.

Radio access latency: In order to reduce battery consumption of a terminal, an operation state of the terminal may be defined as an inactive state or an active state, and the radio access latency may be a time required for the operation state of the terminal to transit from the inactive state to the active state. The inactive state may be referred to as an idle state, and the active state may be referred to as a connected state.

Handover service latency: The handover service latency may be a time (e.g., mobility interruption time (MIT)) during which data transmission and reception is suspended during a handover procedure.

Meanwhile, the radio transmission latency may be classified into a downlink transmission latency and an uplink transmission latency. The downlink transmission latency may be as follows.

Figure 5:
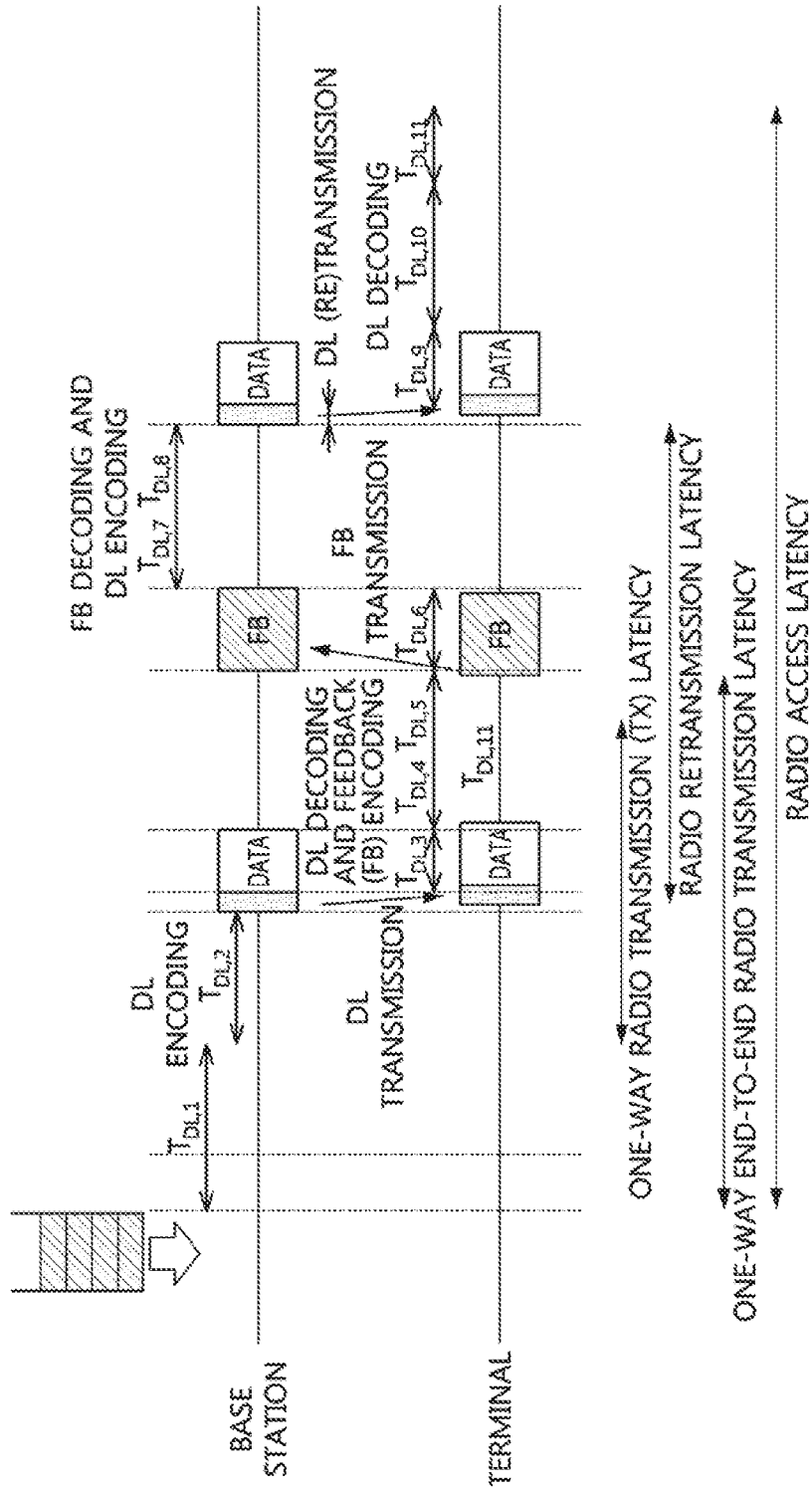
FIG. 5 is a conceptual diagram illustrating a first exemplary embodiment of a downlink transmission latency in a communication system.

FIG. 5 is a conceptual diagram illustrating a first exemplary embodiment of a downlink transmission latency in a communication system.

Referring to FIG. 5, a downlink transmission latency may be classified into a one-way radio transmission (TX) latency, a radio retransmission latency, a one-way end-to-end radio transmission latency, and a radio access latency. $T_{DL,1}$ to $T_{DL,11}$ may be defined as shown in Table 1 below. Table 1 shows mapping relationship between the functional elements and the latencies in the downlink transmission. The 'end-to-end' in Table may indicate the one-way end-to-end radio transmission latency of FIG. 5, the 'one-way' in Table 1 may indicate the one-way radio transmission latency of FIG. 5. The 'retransmission' in Table 1 may indicate the radio retransmission latency of FIG. 5, and the 'access' in Table 1 may indicate the radio access latency of FIG. 5.

TABLE 1

| Description | | Base station | terminal | End-to-end | One-way | retransmission | access |
|---|---|---|---|---|---|---|---|
| $T_{DL,1}$ | L2/L3 processing latency for incoming data | X | | X | | | X |
| $T_{DL,2}$ | L1 processing latency for DL encoding (including TTI alignment) | X | | X | X | | X |
| $T_{DL,3}$ | Time for transmission of DL data | X | | X | X | X | X |
| $T_{DL,4}$ | L1 processing latency for DL decoding | | X | X | X | X | X |
| $T_{DL,5}$ | L1 processing latency for HARQ ACK/NACK encoding | | X | | | X | X |
| $T_{DL,6}$ | Feedback time | | X | | | X | X |
| $T_{DL,7}$ | L1 processing latency for feedback decoding | X | | | | X | X |
| $T_{DL,8}$ | L1 processing latency for DL encoding | X | | | | X | X |
| $T_{DL,9}$ | Time for retransmission of DL data | X | | | | X | X |
| $T_{DL,10}$ | L1 processing latency for DL data decoding | | X | | | X | X |
| $T_{DL,11}$ | L2/L3 processing latency for outgoing data | | X | X | | | X |

Meanwhile, the uplink transmission latency may be as follows.

Figure 6:
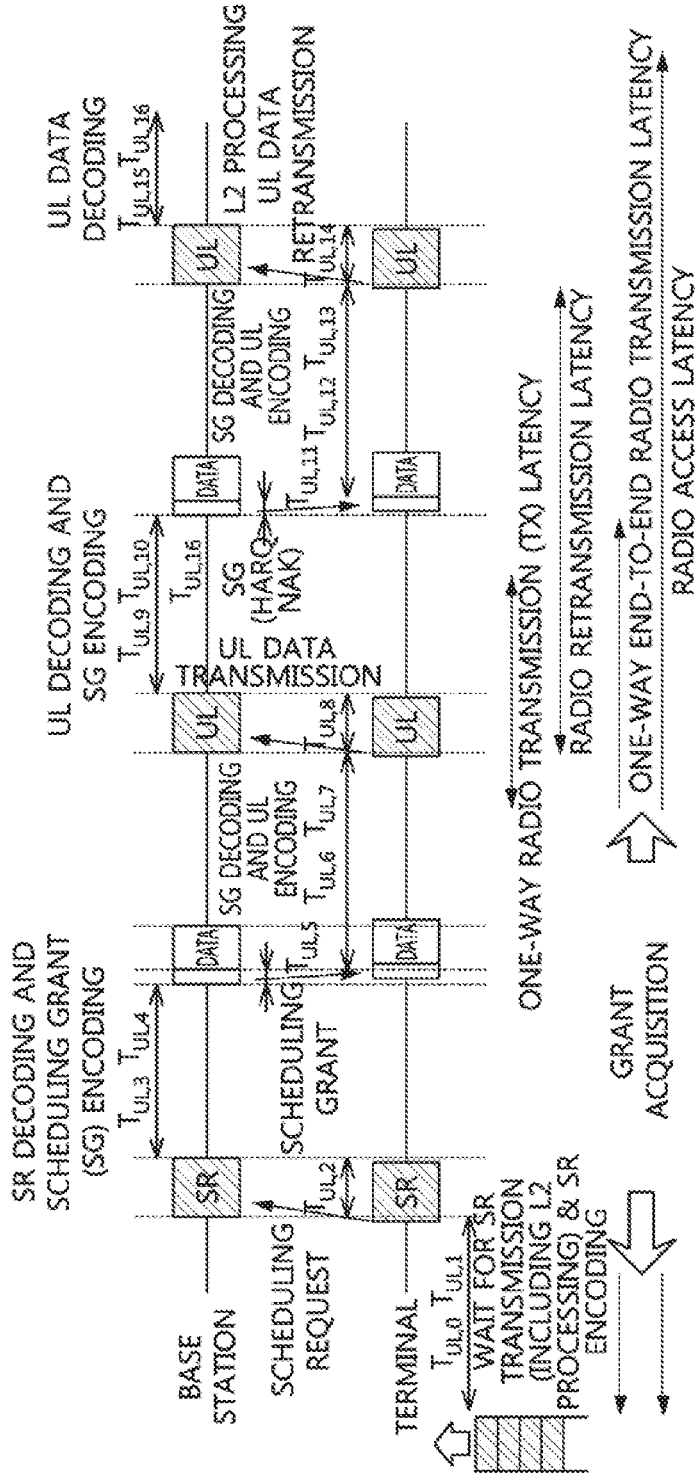
FIG. 6 is a conceptual diagram illustrating a first exemplary embodiment of an uplink transmission latency in a communication system.

FIG. 6 is a conceptual diagram illustrating a first exemplary embodiment of an uplink transmission latency in a communication system.

Referring to FIG. 6, the uplink transmission latency may be classified into a one-way radio transmission (TX) latency, a radio retransmission latency, a one-way end-to-end radio transmission latency, and a radio access latency. $T_{UL,0}$ to $T_{UL,16}$ may be defined as shown in Table 2 below. Table 2 shows mapping relationship between the functional elements and the latencies in the downlink transmission. The 'end-to-end' in Table 2 may indicate the one-way end-to-end radio transmission latency of FIG. 6, the 'one-way' in Table 2 may indicate the one-way radio transmission latency of FIG. 6. The retransmission in Table 2 may indicate the radio retransmission latency of FIG. 6 and the 'access' in Table 2 may indicate the radio access latency of FIG. 6.

TABLE 2

| Description | | Base station | terminal | End-to-end | One-way | retransmission | access |
|---|---|---|---|---|---|---|---|
| $T_{UL,0}$ | Average wait time for scheduling request (SR) (including L2/L3 processing latency for incoming data) | | X | X | | | X |
| $T_{UL,1}$ | L1 processing latency for scheduling grant (SG) decoding | | X | X | | | X |
| $T_{UL,2}$ | Time for transmission of SR | | X | X | | | X |
| $T_{UL,3}$ | L1 processing latency for SR decoding | X | | X | | | X |
| $T_{UL,4}$ | L1 processing latency for SG encoding | X | | X | | | X |
| $T_{UL,5}$ | Time for transmission of SG | X | | X | | | X |
| $T_{UL,6}$ | Processing latency for SG decoding | | X | X | | | X |
| $T_{UL,7}$ | L1 processing latency for UL data encoding | | X | X | X | | X |
| $T_{UL,8}$ | Time for transmission of UL data | | X | X | X | X | X |
| $T_{UL,9}$ | L1 processing latency for UL decoding | X | | X | X | X | X |
| $T_{UL,10}$ | L1 processing latency for SG encoding | X | | | | X | X |
| $T_{UL,11}$ | Time for transmission of SG | X | | | | X | X |
| $T_{UL,12}$ | L1 processing latency for SG decoding | | X | | | X | X |
| $T_{UL,13}$ | L1 processing latency for UL data encoding | | X | | | X | X |
| $T_{UL,14}$ | Time for transmission of UL data | | X | | | | X |
| $T_{UL,15}$ | L1 processing latency for UL data decoding | X | | | | | X |
| $T_{UL,16}$ | L2 processing latency for outgoing data | X | | X | | | X |

Figure 7:
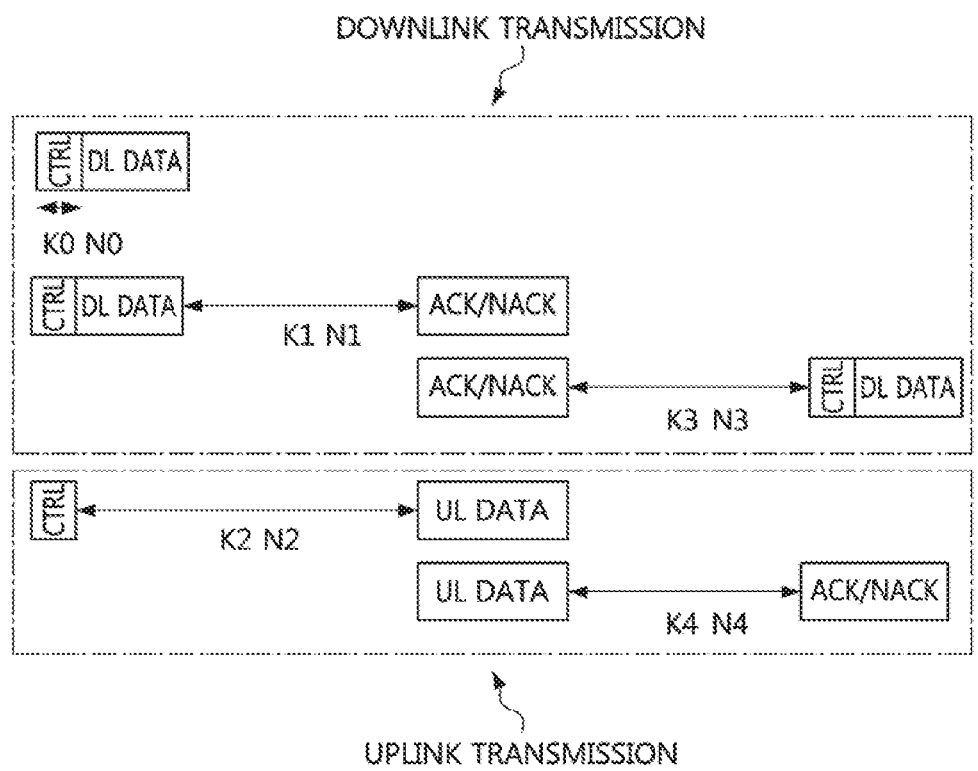
FIG. 7 is a conceptual diagram illustrating latencies in downlink and uplink transmissions in a communication system.

FIG. 7 is a conceptual diagram illustrating latencies in downlink and uplink transmissions in a communication system.

Referring to FIG. 7, a base station may transmit a control channel (CTRL) including a downlink (DL) grant to a terminal, and transmit a data channel including downlink data scheduled by the DL grant to the terminal. The terminal may receive the control channel (CTRL) from the base station, and identify the DL grant included in the control channel (CTRL). The terminal may receive the data channel by monitoring time-frequency resources indicated by the DL grant, and obtain the downlink data included in the data channel. However, when the downlink data is not successfully decoded, the terminal may transmit a NACK to the base station in response to the downlink data. When the NACK is received from the terminal, the base station may retransmit the downlink data.

In the uplink transmission, the base station may transmit a control channel (CTRL) including an uplink (UL) grant to the terminal. The terminal may receive the control channel (CTRL) from the base station, and identify the UL grant included in the control channel (CTRL). The terminal may transmit a data channel including uplink data to the base station through time-frequency resources indicated by the UL grant. The base station may receive the data channel by monitoring time-frequency resources indicated by the UL grant, and obtain the uplink data included in the data channel. The base station may transmit a feedback signal (e.g., ACK or NACK) according to a decoding result of the uplink data to the terminal.

In FIG. 7, the meaning of K0 to K4 and N0 to N4 may be as shown in Table 3 below. In Table 3 below, a latency unit of K0 to K4 may be a TTI, and a latency unit of N0 to N4 may be a symbol.

TABLE 3

| latency | Definition |
| --- | --- |
| K0 | Reception latency of DL grant and the corresponding DL Data (PDSCH) (latency in units of TTIs) |
| K1 | Reception latency of DL data (PDSCH) and transmission latency of the corresponding ACK/NACK (latency in units of TTIs) |
| K2 | Reception latency of UL grant and transmission latency of UL data (PUSCH) (latency in units of TTIs) |
| K3 | Reception latency of ACK/NACK and retransmission latency of the corresponding DL data (PDSCH) (latency in units of TTIs) |
| K4 | Transmission latency of UL data (PUSCH) and reception latency of the corresponding ACK/NACK (latency in units of TTIs) |
| N0 | The number of symbols from the end of DL grant transmission to the transmission start time of the corresponding PDSCH. That is, the number of symbols is the time required for processing at the base station. The number of symbols from the end of DL grant reception to the reception start time of the corresponding PDSCH. That is, the number of symbols is the time required for processing at the terminal. |
| N1 | The number of symbols from the end of PDSCH transmission start time of reception to the the corresponding ACK/NACK. That is, the number of symbols is the time required for processing at the terminal. |
| N2 | The number of symbols from the end of reception of PDSCH containing UL grant to the transmission start time of the corresponding PUSCH. That is, the number of symbols is the time required for processing at the terminal. |
| N3 | The number of symbols from the end of ACK/NACK reception to the retransmission start time of the corresponding PDSCH. That is, the number of symbols is the time required for processing at the base station. |
| N4 | The number of symbols from the end of PUSCH reception to the transmission start time of the corresponding ACK/NACK. That is, the number of symbols is the time required for processing at the base station. The number of symbols from the end of PUSCH transmission to the reception start time of the corresponding ACK/NACK. That is, the number of symbols is the time required for processing at the terminal. |

1 Multiple Resource Allocation 1.1 Multiple Resource Allocation in Downlink

Figure 8A:
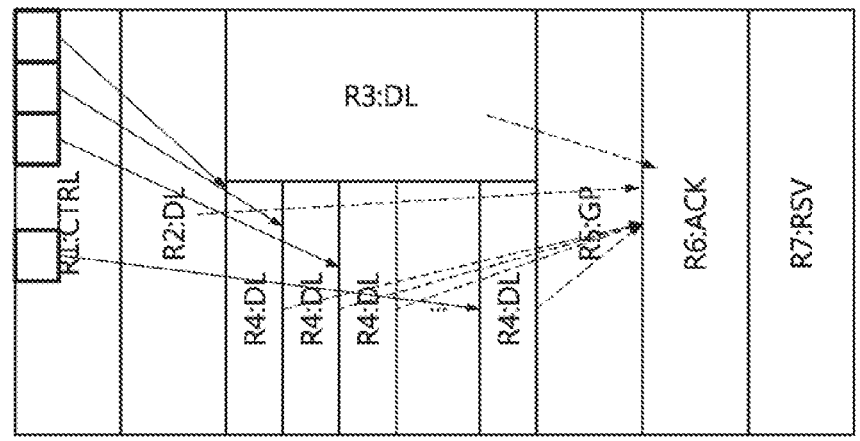
FIG. 8A is a conceptual diagram illustrating a first exemplary embodiment of a downlink multiple resource allocation method in a self-contained (SC) TDD-based communication system.
Figure 8B:
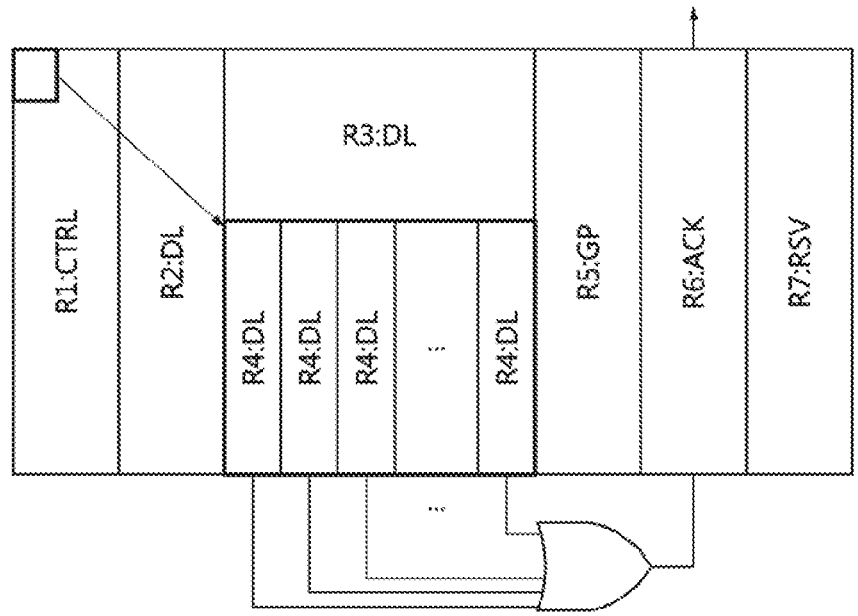
FIG. 8B is a conceptual diagram illustrating a second exemplary embodiment of a downlink multiple resource allocation method in an SC TDD-based communication system.
Figure 8C:
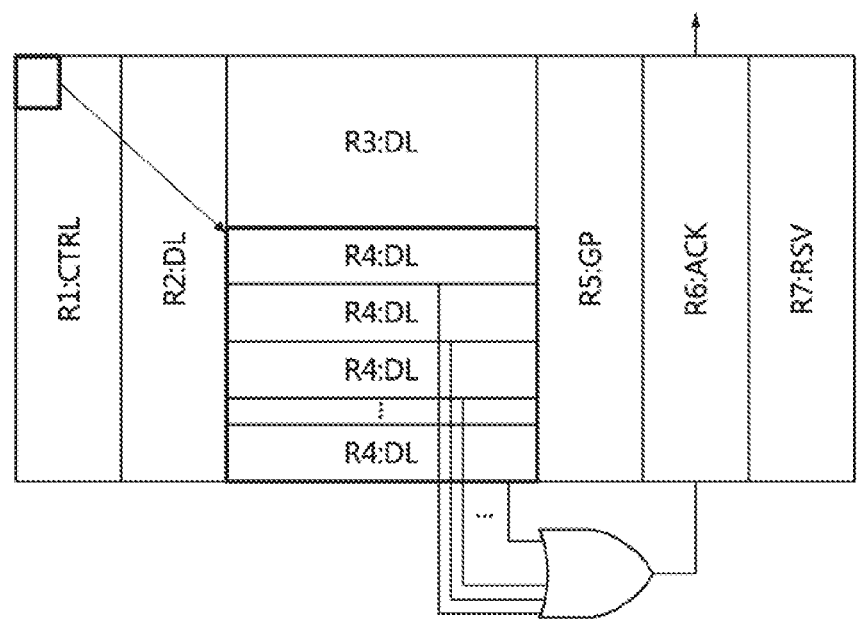
FIG. 8C is a conceptual diagram illustrating a third exemplary embodiment of a downlink multiple resource allocation method in an SC TDD-based communication system.

FIG. 8A is a conceptual diagram illustrating a first exemplary embodiment of a downlink multiple resource allocation method in a self-contained (SC) TDD-based communication system, FIG. 8B is a conceptual diagram illustrating a second exemplary embodiment of a downlink multiple resource allocation method in an SC TDD-based communication system, and FIG. 8C is a conceptual diagram illustrating a third exemplary embodiment of a downlink multiple resource allocation method in an SC TDD-based communication system.

The exemplary embodiments illustrated in FIGS. 8A to 8C may show a method of continuously allocating resources, and may be usefully applied to semi-persistent scheduling (SPS) based communication and configured-grant (CG) based communication. The exemplary embodiments illustrated in FIGS. 8A to 8C may be usefully applied to a scenario in which one transport block is transmitted a predetermined number of times or a predetermined transport block is continuously transmitted a predetermined number of times.

In the exemplary embodiment illustrated in FIG. 8A, a downlink control channel (CTRL) may include resource allocation information for R4:DL within a downlink data channel (DL) (e.g., R2:DL, R3:DL, R4:DL), and an HARQ response (e.g., ACK or NACK) for R4:DL within the downlink data channel (DL) may be transmitted on an uplink control channel (e.g., R6:ACK).

In the exemplary embodiment illustrated in FIG. 8B, a downlink control channel (CTRL) may include one resource allocation information for R4:DL within a downlink data channel (DL). The one resource allocation information may indicate R4:DL continuous in the time axis within the downlink data channel (DL). In this case, the size of the downlink control channel (CTRL) (e.g., resource allocation information within the downlink control channel) may be reduced. In addition, a plurality of HARQ responses for R4:DL within the downlink data channel (DL) may be transmitted as multiplexed, aggregated, or bundled. That is, one HARQ response corresponding to R4:DL within the downlink data channel (DL) may be transmitted.

In the exemplary embodiment illustrated in FIG. 8C, a downlink control channel (CTRL) may include one resource allocation information for R4:DL within a downlink data channel (DL). The one resource allocation information may indicate a predetermined R4:DL (e.g., continuous R4:DL) in the frequency axis within the downlink data channel (DL). In this case, the size of the downlink control channel (CTRL) (e.g., DCI) may be reduced. In addition, a plurality of HARQ responses corresponding to R4:DL within the downlink data channel (DL) may be transmitted as multiplexed, aggregated, or bundled. That is, one HARQ response corresponding to R4:DL within the downlink data channel (DL) may be transmitted.

Figure 9A:
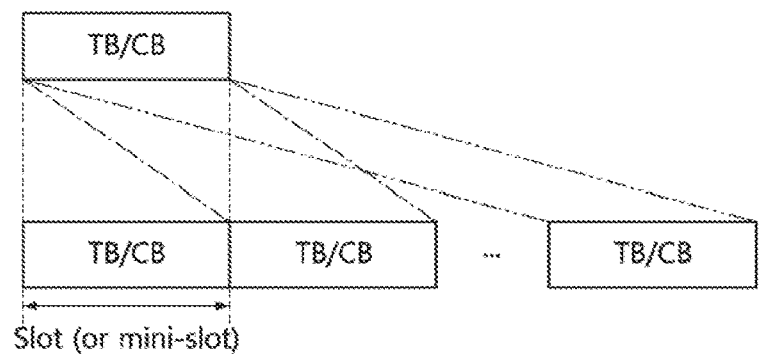
FIG. 9A is a conceptual diagram illustrating a first exemplary embodiment of a method for redundantly transmitting data based on a downlink multiple resource allocation scheme in a communication system.
Figure 9B:
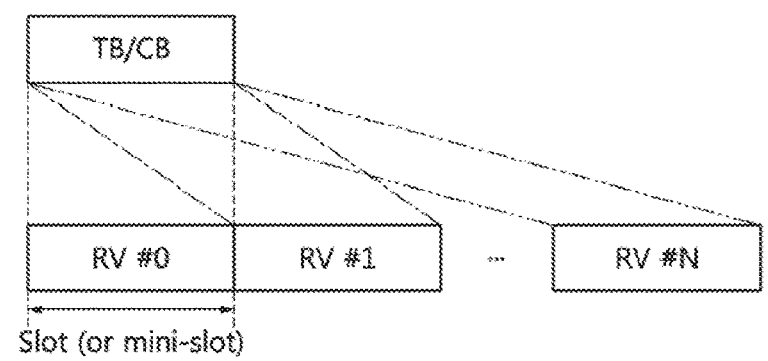
FIG. 9B is a conceptual diagram illustrating a second exemplary embodiment of a method for redundantly transmitting data based on a downlink multiple resource allocation scheme in a communication system.

FIG. 9A is a conceptual diagram illustrating a first exemplary embodiment of a method for redundant transmitting data based on a downlink multiple resource allocation scheme in a communication system. FIG. 9B is a conceptual diagram illustrating a second exemplary embodiment of a method for redundant transmitting data based on a downlink multiple resource allocation scheme in a communication system, and FIG. 9C is a conceptual diagram illustrating a third exemplary embodiment of a method for redundant transmitting data based on a downlink multiple resource allocation scheme in a communication system.

Figure 9C:
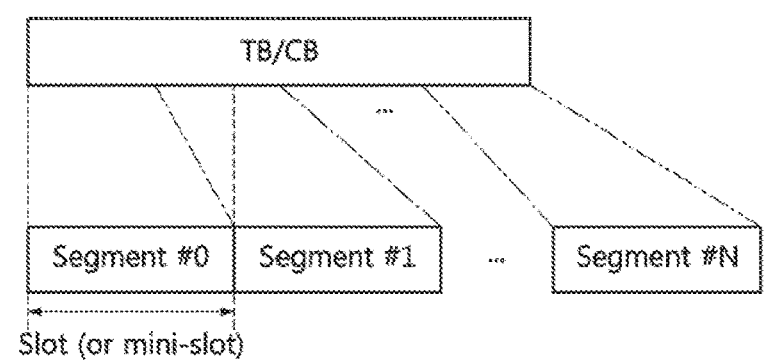
FIG. 9C is a conceptual diagram illustrating a third exemplary embodiment of a method for redundantly transmitting data based on a downlink multiple resource allocation scheme in a communication system.

The exemplary embodiments illustrated in FIGS. 9A to 9C may be applied to sidelink transmission as well as downlink/uplink transmissions. In the exemplary embodiment illustrated in FIG. 9A, a transport block (TB) (e.g., code block) generated based on the same data may be transmitted redundantly. In the exemplary embodiment illustrated in FIG. 9B, data having different redundancy versions (RVs), the same RV, or a certain pattern of RVs may be transmitted. In the exemplary embodiment illustrated in FIG. 9C, when the size of the transport block (TB) or code block (CB) is larger than the size of a mini-slot, the transport block (TB) or code block (CB) may be divided into a plurality of segments, and the plurality of segments (e.g., segments #0 to #N) may be transmitted. A method for redundantly transmitting data based on a multiple resource allocation scheme may be configured through at least one of a higher layer message, MAC CE, and DCI.

Referring back to FIGS. 8B and 8C, a plurality of mini-slots may be scheduled by one resource allocation information. In this case, the terminal may repeatedly transmit the same data by using the plurality of mini-slots scheduled by the one resource allocation information. A resource allocation unit may be a unit of a symbol, a unit of n symbols, a unit of a mini-slot comprising n symbols, or a unit of a slot comprising n symbols or mini-slots. Here, n may be an integer equal to or greater than 1. When n is 1, repetitive transmission in the frequency domain may be performed within one resource allocation unit in the time domain. The above-described exemplary embodiments may be applied not only to the SC TDD-based communication system, but also to a frequency division duplex (FDD)-based communication system, a dynamic TDD-based communication system, and a communication system supporting an unlicensed band.

Figure 10A:
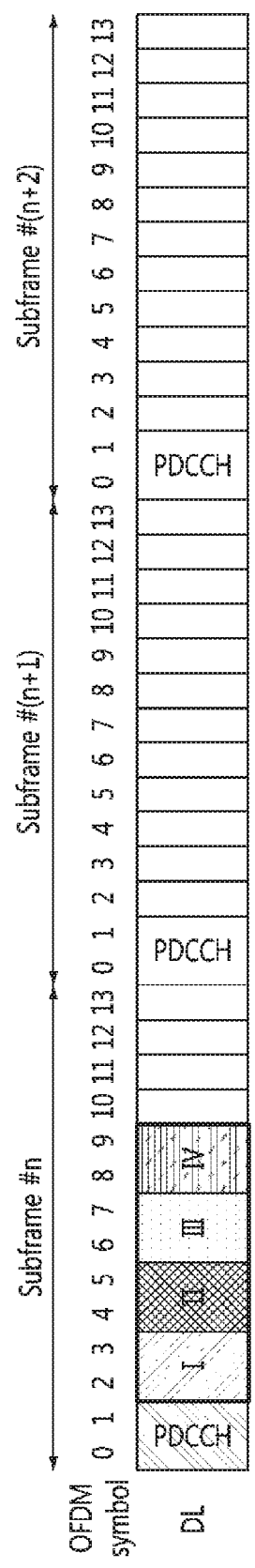
FIG. 10A is a timing diagram illustrating a first exemplary embodiment of a method for redundantly transmitting data in a communication system.
Figure 10B:
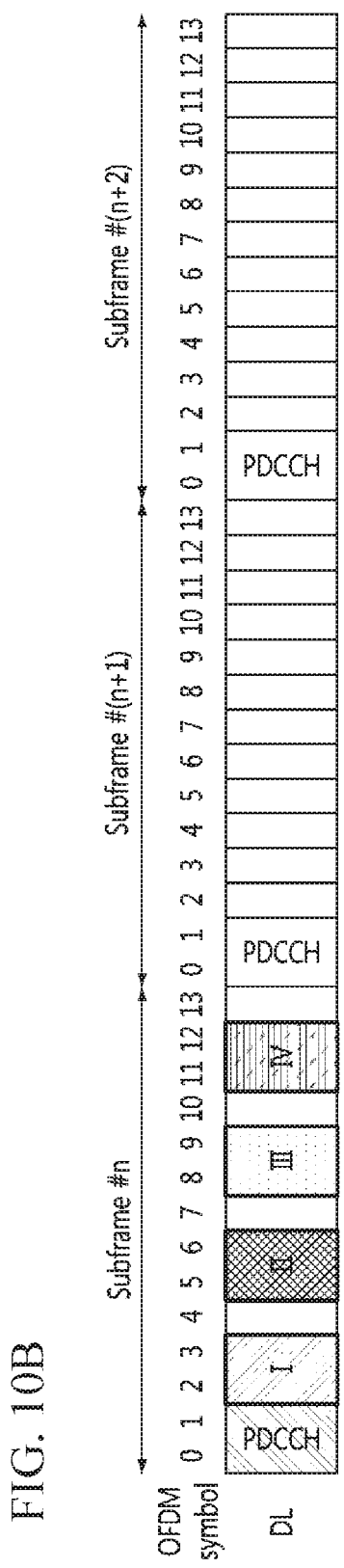
FIG. 10B is a timing diagram illustrating a second exemplary embodiment of a method for redundantly transmitting data in a communication system.
Figure 10C:
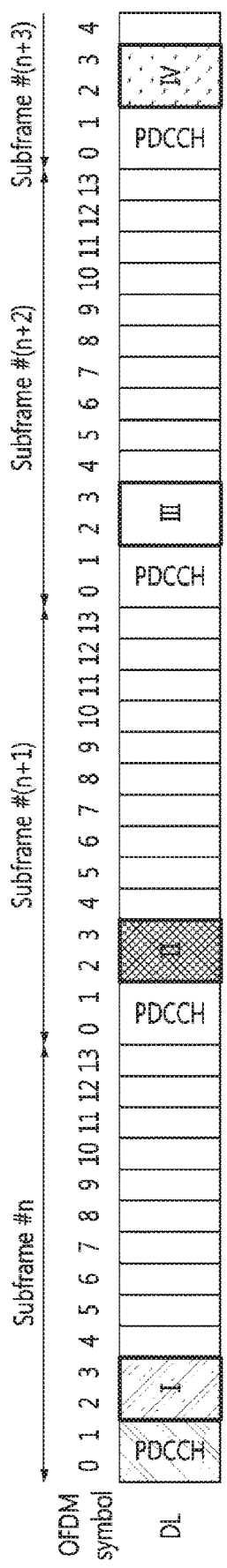
FIG. 10C is a timing diagram illustrating a third exemplary embodiment of a method for redundantly transmitting data in a communication system.
Figure 10D:
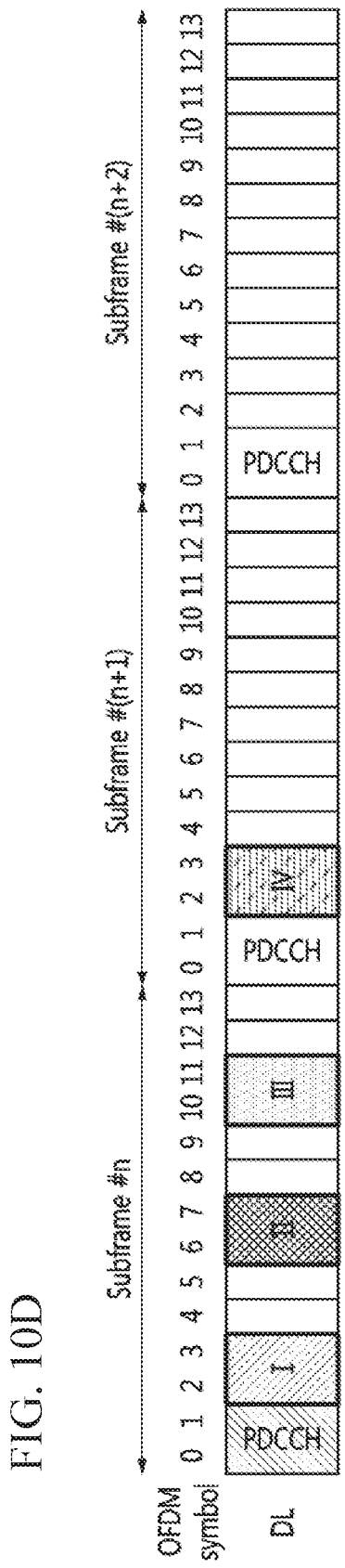
FIG. 10D is a timing diagram illustrating a fourth exemplary embodiment of a method for redundantly transmitting data in a communication system.

FIG. 10A is a timing diagram illustrating a first exemplary embodiment of a method for redundantly transmitting data in a communication system, FIG. 10B is a timing diagram illustrating a second exemplary embodiment of a method for redundantly transmitting data in a communication system, FIG. 10C is a timing diagram illustrating a third exemplary embodiment of a method for redundant transmitting data in a communication system, and FIG. 10D is a timing diagram illustrating a fourth exemplary embodiment of a method for redundant transmitting data in a communication system.

In the exemplary embodiment illustrated in FIG. 10A, mini-slots I to IV each of which is composed of one or more symbols (e.g., two symbols) may be continuously allocated in time in a previous resource (e.g., subframe #n). In the exemplary embodiment illustrated in FIG. 1B, the mini-slots I to IV may be allocated at preconfigured intervals in time in the previous resource (e.g., subframe #n). In the exemplary embodiment shown in FIG. 10C, each of the mini-slots I to IV may be continuously allocated for each resource unit composed of n mini-slots. That is, each of the mini-slots I to IV may be allocated to consecutive subframes or slots. Here, n may be an integer equal to or greater than 1. In the exemplary embodiment illustrated in FIG. 10D, when a resource unit includes n mini-slots, the mini-slots I to IV may be allocated to a plurality of resource units.

In the exemplary embodiments illustrated in FIGS. 10A to 10D, the base station may transmit resource allocation information for the mini-slots I to IV to the terminal. The terminal may identify the allocated mini-slots I to IV based on the resource allocation information received from the base station. A configuration parameter for the resource allocation scheme may be transmitted through at least one of an RRC message, MAC CE, and downlink control channel. The resource allocation information may include information for identifying resources within a slot or subframe in the time or frequency domain.

The resource allocation information may include an interval (e.g., K0 in Table 3) between a control channel including the resource allocation information and a slot indicated by the resource allocation information, a symbol offset (S) from the control channel within the slot, a length (L) (e.g., the length of the mini-slot (e.g., number of OFDM symbols, number of REs, size of the CB, etc.)), the number N of repeatedly/continuously allocated resources, and the like. A configuration value for the resource allocation scheme may additionally include information for data transmission and reception (e.g., MCS, TB/CB size, HARQ information, time for HARQ response feedback, feedback resource information, RNTI, etc.).

The information for data transmission and reception may be transmitted from the base station to the terminal by using one or more of an RRC message, MAC CE, and downlink control channel, together with the configuration value for the resource allocation scheme. Alternatively, the information for data transmission and reception may be transmitted from the base station to the terminal by using one or more of an RRC message, MAC CE, and downlink control channel, separately from the configuration value for the resource allocation scheme. In the TDD-based communication system where downlink and uplink coexist, the resource allocation scheme described above may be applied only to a region used for downlink. In addition, the resource allocation scheme may be valid from an end time of the downlink region to a start time of an uplink region. The same resource allocation scheme may be applied to the current downlink region and the next downlink region.

Hereinafter, exemplary embodiments of the repeated/continuous resource allocation scheme will be described.

Figure 11:
FIG. 11 is a conceptual diagram illustrating a first exemplary embodiment of a continuous/repeated downlink data channel allocation method in a communication system.

FIG. 11 is a conceptual diagram illustrating a first exemplary embodiment of a continuous/repeated downlink data channel allocation method in a communication system.

Referring to FIG. 11, the base station may transmit each repeated/continuous resource allocation information to the terminal, and the terminal may perform a related operation based on the resource allocation information received from the base station.

In the first exemplary embodiment of the resource allocation scheme, resources corresponding to L OFDM symbols starting from a symbol spaced apart from the control channel by S symbols may be allocated N times repeatedly/continuously. Here, it is assumed that a predetermined frequency resource is equally allocated to L OFDM symbols. When a resource M to be allocated repeatedly/continuously (e.g., slot or mini-slot shown in FIG. 11) is larger or smaller than N×L, a resource allocation scheme for this may be required. For example, the resource allocation scheme may be as follows.

L OFDM symbols may be allocated within the first to (N−1)-th resources (e.g., mini-slots), and M−(N−1)×L OFDM symbols may be allocated within the N-th resource. Here, among all REs included in the resource M corresponding to L OFDM symbols instead of one OFDM symbol, REs used for data transmission may be divided into N parts, and the divided REs may be used. In this case, REs (i.e., REs available for data transmission) that are not used for a specific purpose (e.g., synchronization signal, PBCH, reference signal, etc.) among the REs may be allocated/divided for data transmission.

In the second exemplary embodiment of the resource allocation scheme, L OFDM symbols starting from a symbol spaced apart from the control channel by S symbols may be used as a resource M to be allocated repeatedly/continuously, and the resource M may be divided into N parts. The N resources may be used as repeated/continuous resources (e.g., mini-slots). Here, it is assumed that a predetermined frequency resource is equally allocated to L OFDM symbols. Resources may be allocated in units of L/N symbols. Accordingly, the first to (N−1)-th resources may be allocated equally based on ⌈L/N⌉ or ⌊L/N⌋. Since the N-th resource is allocated based on L−⌈L/N⌉ or L−⌊L/N⌋, the N-th resource may be allocated differently from the first to (N−1)-th resources.

Here, among all REs included in the resource M, REs used for data transmission may be divided into N parts, and the N resources may be used as repeated/continuous resources. In this case, REs that are not used for a specific purpose (e.g., synchronization signal. PBCH, reference signal, etc.) among the REs may be allocated/divided for data transmission.

Meanwhile, in general, reference signals used for channel measurement, estimation, demodulation, and the like may be arranged in various patterns according to configuration of resources used for data transmission. In this case, an RE mapping scheme having different patterns may be applied to the repeated/continuous resources. In this case, accurate configuration/operation between the base station and the terminal may be required. To this end, reference signals having the same pattern may be mapped to N resources or resources according to a preconfigured interval, which belong to the resource M included in the L OFDM symbols within the repeatedly/continuously-allocated resource. Alternatively, if the entire resource M is determined to be one resource, reference signals may be configured to have a unique pattern within the entire resource M.

When the repeated/continuous resources are allocated (or divided), the resources divided differently may be as follows.

Scheme #1

The length (e.g., the number of symbols) of the last resource among resources belonging to a slot (or, subframe, allocation unit of continuous resources) may be configured to be shorter than the length of other resources. For example, when a slot is composed of 14 symbols, and a configuration unit of the repeated/continuous resource (e.g., mini-slot) is 3 symbols, the last resource in the slot may be composed of 2 symbols, and the remaining resources except the last resource among the resources may be allocated in units of 3 symbols. That is, the remaining resources may be allocated repeatedly/continuously in units of 3 symbols.

Scheme #2

When the length (e.g., the number of symbols) of the last resource among resources belonging to a slot (or, subframe, allocation unit of continuous resources) is shorter than the length of other resources, the last resource may not be used for data transmission. For example, when a slot is composed of 14 symbols and a configuration unit of the repeated/continuous resource (e.g., mini-slot) is 3 symbols, since the last resource within the slot is composed of 2 symbols, it may not be used as a resource for the repeated/continuous allocation, and the remaining resources except the last resource among the resources may be allocated in units of 3 symbols. That is, the remaining resources may be allocated repeatedly/continuously in units of 3 symbols. In particular, in the TDD-based communication system, the last resource may be used as a GP or SG for switching between downlink and uplink (i.e., RF change). Alternatively, the last resource may be used as a processing time for generating feedback corresponding to a downlink data service.

Scheme #3

When the length (e.g., the number of symbols) of the last resource among resources belonging to a slot (or, subframe, allocation unit of continuous resources) is shorter than the length of other resources, the last resource (e.g., N-th resource) and a resource (e.g., (N−1)-th resource) before the last resource may be integrated into one resource. For example, when a slot is composed of 14 symbols and a configuration unit of the repeated/continuous resource (e.g., mini-slot) is 3 symbol, the last resource within the slot may be composed of 5 symbols, and the remaining resources other than the last resource among the resources may be allocated in units of 3 symbols. That is, the remaining resources may be allocated repeatedly/continuously in units of 3 symbols.

Scheme #4

The lengths (e.g., the numbers of symbols) of the remaining resources except the first resource among resources belonging to a slot (or, subframe, allocation unit of continuous resources) may be configured to be the same. For example, when a slot is composed of 14 symbols, and a configuration unit of the repeated/continuous resources (e.g., mini-slot) is 3 symbols, the first resource in the slot may be composed of 5 symbols, and the remaining resources excluding the first resource among the resources may be allocated in units of 3 symbols. That is, the remaining resources may be allocated repeatedly/continuously in units of 3 symbols.

On the other hand, when a control channel (e.g., a mini-slot specific downlink control channel or CORESET) is included in each resource (e.g., mini-slot), the base station may transmit to the terminal a general downlink control channel (e.g., PDCCH) including resource allocation information of a mini-slot specific downlink control channel as well as resource allocation information of a resource (e.g., PDSCH) used as the repeated/continuous resource. In this case, the resource allocation information for the repeated/continuous resource may be transmitted through the mini-slot specific downlink control channel instead of the PDCCH.

In another method, the terminal may identify resource allocation information for the repeated/continuous resource based on resource allocation information (e.g., frequency resource allocation information) of a mini-slot specific downlink control channel included in a PDCCH received from the base station. For example, a frequency resource of the mini-slot specific downlink control channel may be configured to be the same as a frequency resource for the repeated/continuous resource, and data may be transmitted and received through the repeated/continuous resource.

Figure 12:
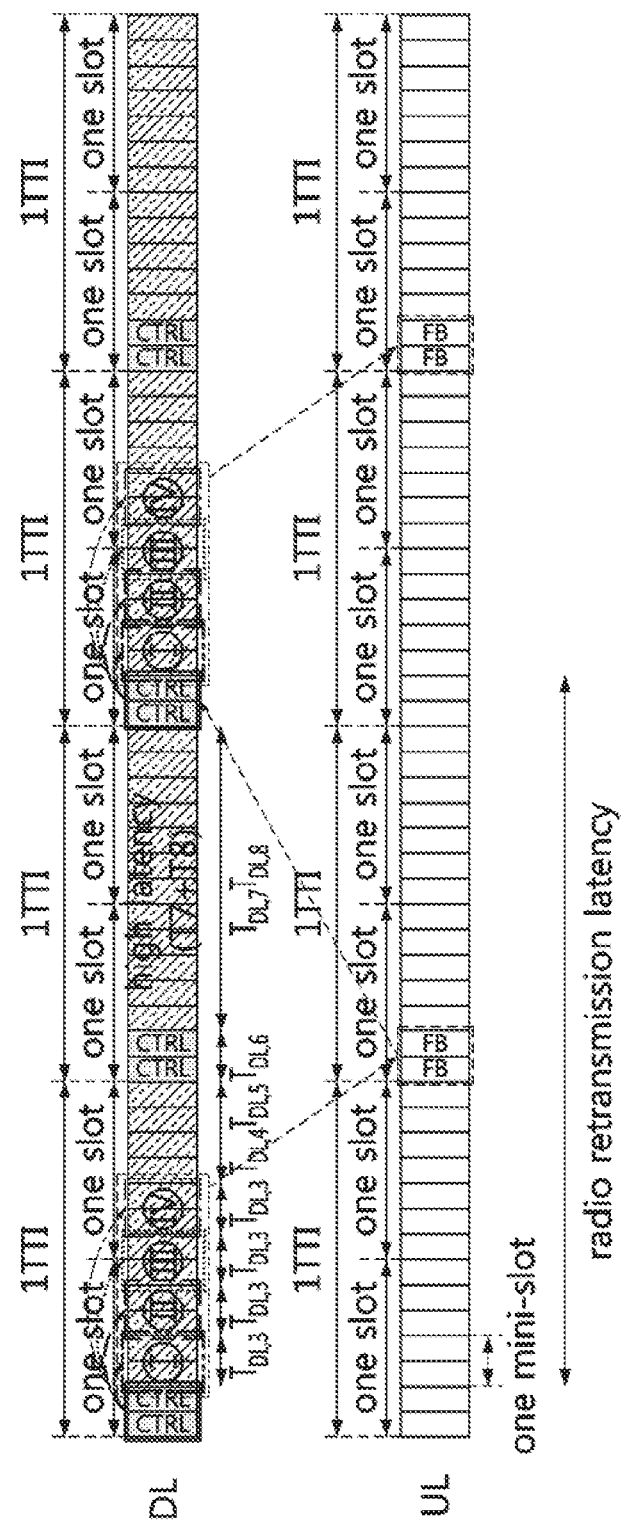
FIG. 12 is a timing diagram illustrating a fifth exemplary embodiment of a method for redundantly transmitting data in a communication system.

FIG. 12 is a timing diagram illustrating a fifth exemplary embodiment of a method for redundantly transmitting data in a communication system.

Referring to FIG. 12, a communication node (e.g., base station and terminal) belonging to a communication system may support SPS-based communication and/or CG-based communication. A resource allocation unit may be a predetermined number (e.g., 2) of mini-slots, and the two mini-slots, which are a resource allocation unit, may be referred to as a 'mini-slot set.' The base station may transmit resource allocation information indicating mini-slot sets (e.g., I, II, III, and IV) used for redundant, repetitive, or continuous transmission of data through a downlink control channel (CTRL). In the exemplary embodiments below, the redundant transmission of data may have meaning of including the repetitive or continuous transmission of the data, the repetitive transmission of data may have meaning of including the redundant or continuous transmission of the data, and the continuous transmission of data may have meaning of including the redundant or repetitive transmission of the data.

Based on the resource allocation scheme described above, the continuous/repeated resources may be allocated in adjacent resources continuously or according to a preconfigured interval. Alternatively, when a resource unit (e.g., subframe, slot) composed of n mini-slots is configured, the continuous/repeated resources may be allocated in continuous resource units. In the continuous resource units, allocation positions of the continuous/repeated resources may be the same. Here, n may be an integer equal to or greater than 1.

The base station may repeatedly transmit data (e.g., TB or CB) in the mini-slot sets I, II, III, and IV indicated by the resource allocation information. The data transmitted through the mini-slot set I may be referred to as 'data I,' the data transmitted through the mini-slot set II may be referred to as 'data II,' the data transmitted through the mini-slot set III may be referred to as 'data III,' and the data transmitted through the mini-slot set IV may be referred to as 'data IV.' The terminal may obtain resource allocation information through a downlink control channel (CTRL), and receive the data (e.g., TB or CB) from the base station in the mini-slot sets I, II, III, and IV indicated by the resource allocation information.

The terminal may combine demodulated data received in the mini-slot sets I, II, III, and IV, perform decoding on the combining result, and generate one HARQ response based on the decoding result. The terminal may transmit the HARQ response (FB) to the base station on an uplink control channel. Here, one HARQ response may be transmitted to the base station instead of HARQ responses for the data received respectively in the mini-slot sets I, II, III, and IV. Since the same data may be repeatedly transmitted in the mini-slot sets I, II, III, and IV, the data transmission rate may be improved. That is, a reception error rate at the terminal may be reduced.

Here, each of $T_{DL,3}$, $T_{DL,4}$, $T_{DL,5}$, $T_{DL,6}$, $T_{DL,7}$, and $T_{DL,8}$ may be the same as each of $T_{DL,3}$, $T_{DL,4}$, $T_{DL,5}$, $T_{DL,6}$, $T_{DL,7}$, and $T_{DL,8}$ in the exemplary embodiment illustrated in FIG. 5, respectively. The base station may transmit a higher layer message (e.g., radio resource control (RRC) message), a medium access control (MAC) control element (CE), and/or a downlink control channel (e.g., DCI) including information indicating the number of repetitive transmissions of data (or duration of repetitive transmission, number of mini-slot sets, duration of mini-slot sets).

When each of the mini-slots includes a mini-slot specific downlink control channel (i.e., 'DL m-Control CH'; downlink mini-slot specific control channel), a new data indicator (NDI) and a redundancy version (RV) for the redundately transmitted data may be included in the mini-slot specific downlink control channel. The above-described exemplary embodiments may be applied not only to a scenario in which the same data is transmitted twice or more, but also to a scenario in which two or more different data are continuously transmitted. That is, the same data having the same HARQ process ID may be transmitted as configured with the same RV, different RVs, or a certain pattern of RVs. Alternatively, different data having different HARQ process IDs may be transmitted as configured with the same RV, different RVs, or a certain pattern of RVs. In this case, the terminal receiving the data may transmit an HARQ response corresponding to each of the data to the base station.

In the exemplary embodiment illustrated in FIG. 12, the base station may perform a data retransmission procedure based on a feedback result of the terminal (e.g., HARQ response). A latency from a reception time of the feedback result to a transmission time of a downlink control channel including resource allocation information for retransmission data (e.g., data retransmission latency) may be $T_{DL,7}+T_{DL,8}$ (i.e., T7+T8). Each time unit of $T_{DL,3}$, $T_{DL,4}$, $T_{DL,5}$, $T_{DL,6}$, $T_{DL,7}$ and $T_{DL,8}$ may be a symbol unit. Each of $T_{DL,3}$, $T_{DL,4}$, $T_{DL,5}$, $T_{DL,6}$, $T_{DL,7}$, and $T_{DL,8}$ may increase or decrease depending on the implementation or configuration. In this case, the retransmission time of the data may be changed.

In the data retransmission procedure, a time for the decoding operation of the feedback result (e.g., HARQ response), a time for the generation operation (e.g., encoding operation) for the downlink control channel, and a time for the generation operation (e.g., encoding operation) for the downlink data channel (e.g., downlink data channel including the retransmission data) may be required. However, due to transmission restrictions of the downlink control channel (e.g., the downlink control channel is transmitted from the first symbol within the TTI), unnecessary latency (e.g., T7+T8) may occur.

In order to solve this problem, the terminal may perform a parallel processing operation on the data received from the base station. The parallel processing operation may be performed as follows.

Figure 13:
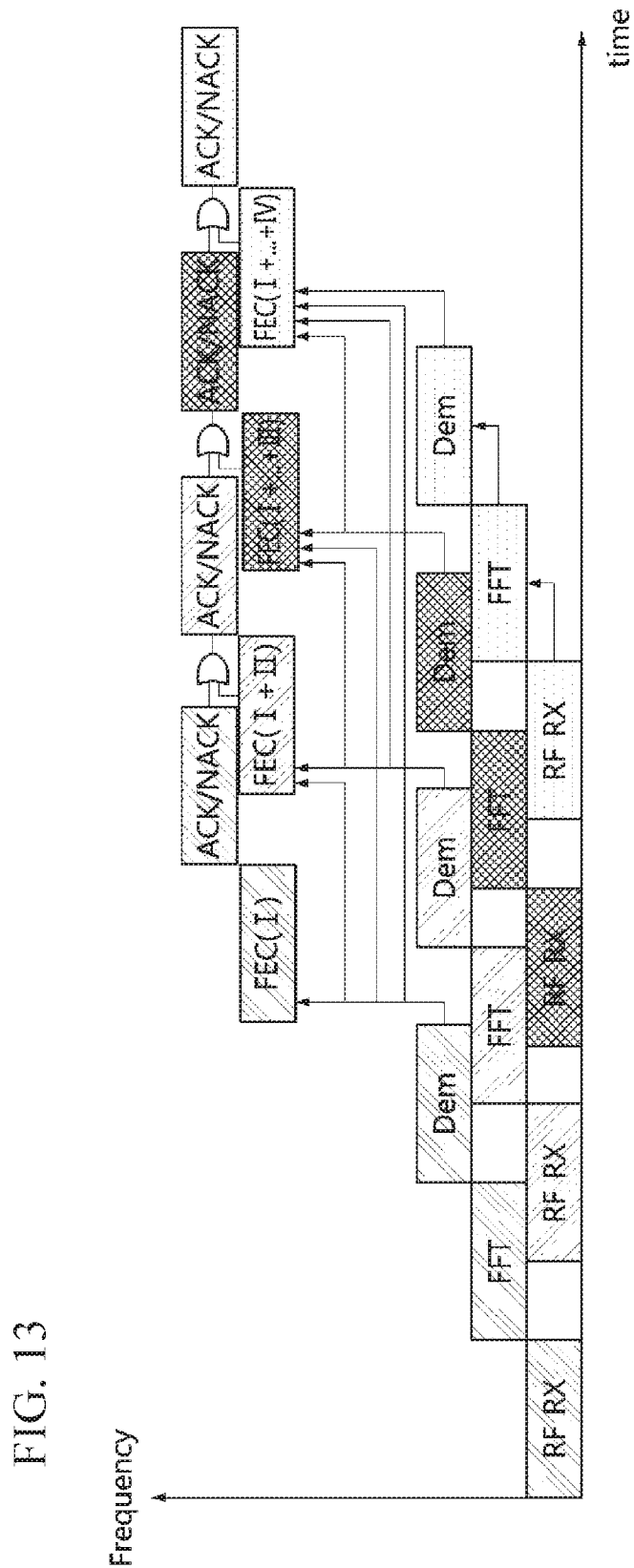
FIG. 13 is a timing diagram illustrating a first exemplary embodiment of a method for parallel processing of data in a communication system.

FIG. 13 is a timing diagram illustrating a first exemplary embodiment of a method for parallel processing of data in a communication system.

Referring to FIG. 13, the base station may repeatedly transmit data, and the terminal may receive a plurality of data from the base station. In this case, a data reception processing operation (e.g., RF reception (RX), fast Fourier transform (FFT), demodulation (Dem), and decoding including forward error correction (FEC)) may be performed in parallel processing units (e.g., mini-slot sets I to IV shown in FIG. 12, preconfigured number of symbols, TTIs, slots) instead of a data unit. In the exemplary embodiment illustrated in FIG. 12, the data reception processing operations may be performed in parallel, and in this case, a method of redundantly transmitting data may be as follows.

Figure 14:
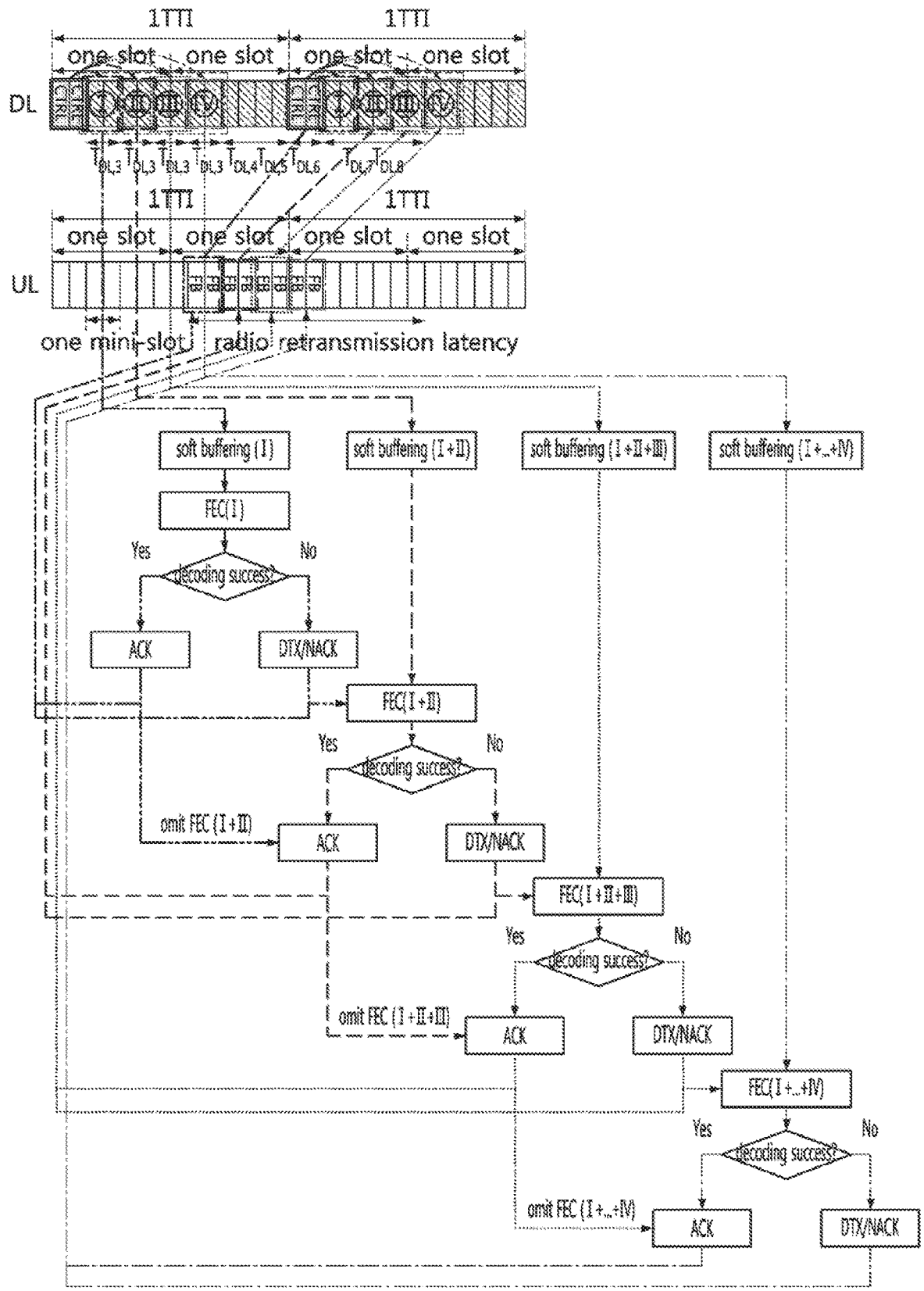
FIG. 14 is a timing diagram illustrating a sixth exemplary embodiment of a method for redundantly transmitting data in a communication system.

FIG. 14 is a timing diagram illustrating a sixth exemplary embodiment of a method for redundant transmitting data in a communication system.

Referring to FIG. 14, the terminal may perform a data reception processing operation (e.g., RF RX, FFT, Dem, and decoding including FEC) in the mini-slot set I. The terminal may generate ACK or NACK according to a result of the decoding, and may transmit ACK or NACK to the base station. Alternatively, the terminal may not transmit NACK to the base station when the decoding fails, but may transmit ACK to the base station when the decoding succeeds. In this case, since NACK is not transmitted, power may be saved in the terminal. Alternatively, when the decoding succeeds, the terminal may not transmit ACK to the base station, but when the decoding fails, the terminal may transmit NACK to the base station.

The terminal may perform a data reception processing operation (e.g., RF RX, FFT, Dem, and decoding including FEC) in the mini-slot set II. Here, a decoding operation may be performed on the data I obtained from the mini-slot set I and the data II obtained from the mini-slot set II. For example, the data II obtained from the mini-slot set II may be combined with the data I obtained from the mini-slot set I, and a decoding operation on the combining result may be performed.

When the result of the decoding operation on the data I obtained from the mini-slot set I is ACK, the terminal may terminate the data reception processing operation even before termination of the decoding operations in the subsequent mini-slot sets II to IV. When necessary, the terminal may transmit ACK. Alternatively, when the result of the decoding operation on the data I obtained from the mini-slot set I is ACK, the data reception processing operations in the remaining mini-slot sets II to IV may be omitted. That is, transmission of HARQ responses for the data II to IV transmitted in the remaining mini-slot sets II to IV may be omitted. That is, the terminal may not transmit the HARQ responses to the base station, and the base station may not receive the HARQ responses from the terminal. Alternatively, when the HARQ response corresponding to the previous data (e.g., data I) is ACK, the base station may not perform the reception operation of the HARQ responses for the data II to IV.

When it is determined that the data has been successfully received in the previous data reception processing operation, the terminal may not perform the subsequent data reception processing operation. On the other hand, when it is determined that the data has not been successfully received in the previous data reception processing operation, the terminal may perform a decoding operation on newly acquired data and the data obtained in the previous data reception processing operation. The method described above may be applied to the data reception processing operations in the mini-slot sets II to IV.

The transmitting end (e.g., base station) may receive the HARQ response (e.g., ACK or NACK) from the receiving end (e.g., terminal), and perform a new data transmission procedure or a data retransmission procedure based on the HARQ response. Alternatively, the transmitting end may terminate the data transmission procedure. The receiving end may transmit NACK only when data retransmission is required, and may transmit ACK only when the data has been successfully received (e.g., decoded). That is, the transmitting end may determine that data has been successfully transmitted only when ACK is received from the receiving end, and may perform a new data transmission procedure or terminate the data transmission procedure.

Specifically, the terminal may identify resource allocation information (e.g., the number of repetitive transmissions, resource allocation information for initial transmission or retransmission, characteristic information of the data, resource allocation information for transmission of an HARQ response, etc.) by receiving a downlink control channel (e.g., PDCCH, control resource set (CORESET), mini-slot specific downlink control channel), and obtain data by performing a data reception processing operation on a resource (e.g., mini-slot) indicated by the resource allocation information.

For example, the terminal may receive the data based on the identified characteristic information of the data, and may transmit an HARQ response corresponding to the received data through the resource indicated by the downlink control channel. Alternatively, the resource allocation information for transmission of the HARQ response may not be indicated by the downlink control channel. In this case, the terminal may transmit the HARQ response to the base station in the first uplink subframe, the first mini-slot, or the first symbol after a preconfigured time (e.g., processing time Tproc). After transmitting the HARQ response, the terminal may monitor the resource indicated by the downlink control channel and the resource allocation information to receive new data or retransmission data.

Retransmission information (e.g., NDI, RV, etc.) may be transmitted from the base station to the terminal through the downlink control channel. The downlink control channel may include feedback-related information (e.g., ACK/NACK feedback information for the data). That is, the feedback-related information (e.g., a feedback time of the HARQ response, a transmission position of the HARQ response, etc.) for the downlink data as well as the resource allocation information may be transmitted on the downlink control channel.

Unlike the exemplary embodiment illustrated in FIG. 12, in exemplary the embodiment illustrated in FIG. 14, the HARQ response corresponding to each data may be transmitted. The data reception processing operation of the terminal according to the exemplary embodiments illustrated in FIGS. 13 and 14 may be performed as follows.

FIG. 15 is a conceptual diagram illustrating a first exemplary embodiment of a data reception processing operation in a communication system.

Referring to FIG. 15, when data is not successfully received from the base station, the terminal may temporarily store the corresponding data and receive retransmission data (or repetitive transmission data) from the base station. The terminal may combine the retransmission data and the stored previous data, and perform a FEC operation on the combined data. When the data I, II, III, and IV are initial data, the data V, VI, VII, and VIII are retransmission data, and the data V is received after failing to receive the data I, II, III, and IV, the terminal may combine the data V with at least one of the data I, II, III, and IV, and perform an FEC operation (e.g., decoding operation) on the combined data. The terminal may transmit an HARQ response (ACK or NACK) according to a result of the FEC operation to the base station. The above method may also be applied to data reception processing operations for the data VI, VII, and VII, in which case the data transmission rate may be improved.

Meanwhile, when the HARQ response (e.g., feedback) for each data is received as in the exemplary embodiment illustrated in FIG. 12, the base station may determine whether to perform a data retransmission procedure based on the HARQ response received before the retransmission latency (e.g., T7+T8). When it is determined that retransmission of the data is necessary (e.g., when NACK is received), the base station may perform a data retransmission procedure. On the other hand, when it is determined that retransmission of the data is not necessary (e.g., when ACK is received), the base station may perform a new data transmission procedure or terminate the data transmission procedure. For example, when one or more of the following conditions are satisfied, the base station may perform the data retransmission procedure (e.g., data channel allocation operation, data retransmission operation).

Condition 1: When the HARQ response corresponding to the data I is NACK

Condition 2: When the HARQ response corresponding tor the data I is not received within a preconfigured time Condition 3: When the HARQ response corresponding to data (e.g., data II) after the data I is not received before a resource allocation time for retransmission of the data I When ACK is received from the terminal during the execution of the data retransmission procedure, the base station may stop the data retransmission procedure. Alternatively, the base station may transmit a signal (e.g., zero padding) indicating that ACK has been successfully received or transmit new data. For transmission of new data (e.g., data III), the base station may transmit a downlink control channel or MAC CE including information indicating that the new data is to be transmitted before transmission of the new data.

Meanwhile, the base station may transmit a downlink control channel or MAC CE (e.g., MAC CE header) including information indicating start, change, or termination of multiple resource allocation. In this case, the terminal receiving the downlink control channel may transmit an HARQ response (e.g., ACK or NACK) for the downlink control channel to the base station. When ACK corresponding to the downlink control channel including information indicating start, change, or termination of multiple resource allocation is received from the terminal, the base station may determine that the corresponding downlink control channel has been successfully received at the terminal.

On the other hand, when ACK corresponding to the downlink control channel or MAC CE (e.g., MAC CE header) that includes information indicating start, change, or termination of multiple resource allocation is not received within a preconfigured time, or when NACK corresponding to the information indicating start, change, or termination of multiple resource allocation is received, the base station may determine that the corresponding downlink control channel or MAC CE (e.g., MAC CE header) has not been successfully received at the terminal. In this case, the base station may perform a retransmission operation of the downlink control channel or MAC CE (e.g., MAC CE header) including the information indicating start, change, or termination of multiple resource allocation, or a transmission operation of a downlink control channel or MAC CE (e.g., MAC CE header) including information indicating start, change, or termination of new multiple resource allocation.

When a plurality of downlink control channels (or MAC CEs) including the information indicating start, change, or termination of multiple resource allocation are received, the terminal may expect the multiple resource allocation to be started, changed, or terminated based on the most recently received downlink control channel (or MAC CE). Alternatively, when data transmission is not performed for a predetermined time based on preconfigured multiple resource allocation information, the terminal may determine that the multiple resource allocation information is invalid. Since new data transmission is expected when the multiple resource allocation is changed, the terminal may transmit an HARQ response corresponding to new data received from the base station instead of an HARQ response corresponding to the downlink control channel (or, MAC CE) including the information indicating change of the multiple resource allocation. That is, the HARQ response corresponding to the downlink control channel (or MAC CE) including the information indicating change of the multiple resource allocation may be replaced by the HARQ response corresponding to the new data.

In the exemplary embodiment illustrated in FIG. 12, when data retransmission is required according to the HARQ response from the terminal, in order to reduce the retransmission latency (e.g., T7 ($T_{DL,7}$)+T8 ($T_{DL,8}$)), the data may be retransmitted by using a pre-allocated resource even when the decoding operation, feedback operation, and retransmission operation for the initial data are not completed, and thus the retransmission latency can be reduced.

Figure 16:
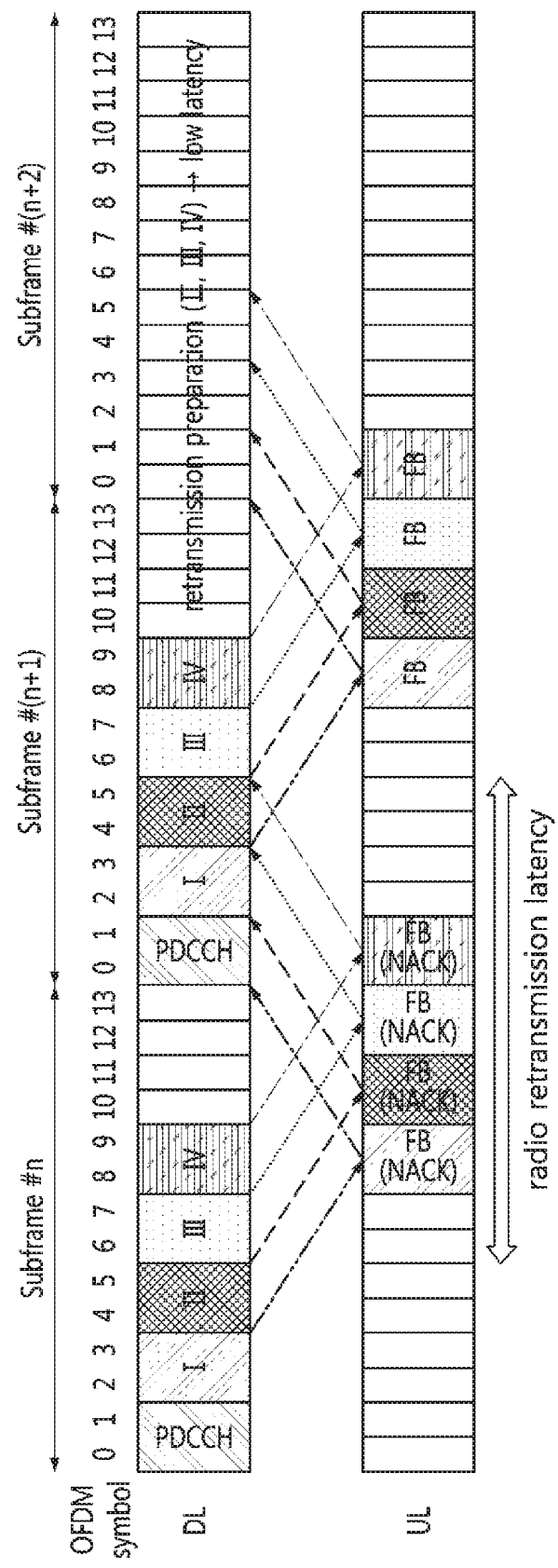
FIG. 16 is a timing diagram illustrating a seventh exemplary embodiment of a method for redundantly transmitting data in a communication system.

FIG. 16 is a timing diagram illustrating a seventh exemplary embodiment of a method for redundantly transmitting data in a communication system.

Referring to FIG. 16, initial data (e.g., data I, II, III, and IV) may be transmitted in a subframe #n. When a retransmission time according to an HARQ response corresponding to the initial data is a subframe #(n+k), a retransmission resource may be allocated before the subframe #(n+k), and retransmission resource allocation information may be transmitted before the subframe #(n+k). For example, the retransmission resource may be configured in a subframe #(n+l) (here, l is an integer equal to or smaller than k).

In this case, the base station may retransmit the data by using the retransmission resource after the initial data transmission. Even when a decoding operation for the initial data is not completed, the terminal may receive the retransmission data in the preconfigured resource, may combine the retransmission data with the initial data, may perform decoding on the combining result, and may transmit an HARQ response according to the decoding result to the base station. In this case, the above-described redundant/continuous data transmission method using continuously allocated resources may be applied. For example, the same data (e.g., TB or CB) may be repeatedly transmitted as in the exemplary embodiment illustrated in FIG. 9A. Alternatively, as in the exemplary embodiment illustrated in FIG. 9B, data having different RVs or data having a preconfigured pattern of RVs for a TB or CB having the same process ID may be continuously transmitted. Alternatively, segments may be continuously transmitted as in the exemplary embodiment illustrated in FIG. 9C.

Figure 17:
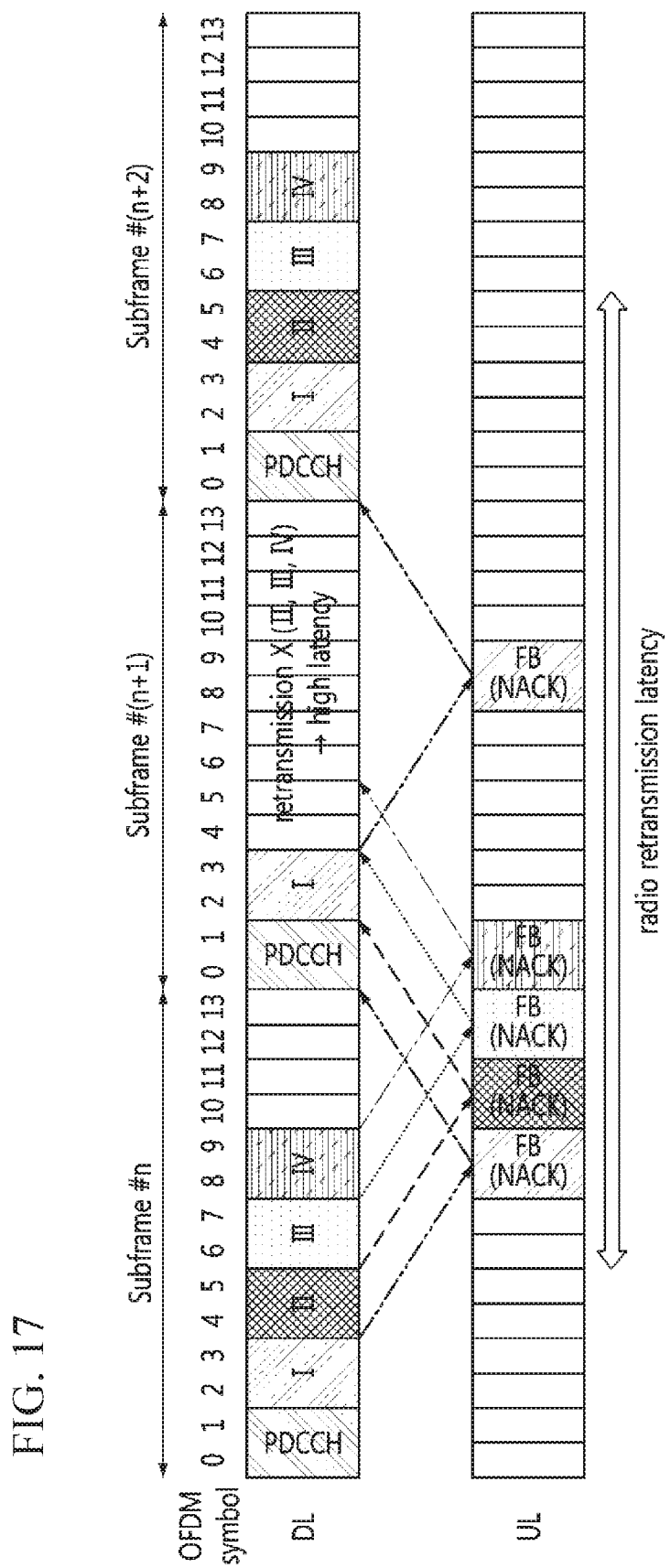
FIG. 17 is a timing diagram illustrating an eighth exemplary embodiment of a method for redundantly transmitting data in a communication system.

FIG. 17 is a timing diagram illustrating an eighth exemplary embodiment of a method for redundantly transmitting data in a communication system.

Referring to FIG. 17, a retransmission resource for initial data (e.g., data I, II, III, and IV) transmitted in a subframe #n may be previously allocated in a subframe #(n+1). When an HARQ response is received before a transmission time of a downlink control channel including retransmission resource allocation information, the base station may perform a data retransmission operation (e.g., transmission operation of a downlink control channel including the retransmission resource allocation information, retransmission operation of the data) based on the corresponding HARQ response (e.g., HARQ response corresponding to the data I) in the subframe #(n+1).

On the other hand, in order to transmit the downlink control channel including the retransmission resource allocation information for the initial data transmitted in the subframe #n in the subframe #(n+1), a decoding operation and reallocation operation of the HARQ response should be completed before the generation (e.g., DCI configuration, RE mapping, etc.) of the downlink control channel (e.g., in the subframe #n). When the HARQ-related operation and data retransmission-related operation based on the HARQ response are not completed before the generation of the downlink control channel, the base station may perform the data retransmission procedure based on the corresponding HARQ response (e.g., HARQ response corresponding to the data II, III, and IV) in a coming subframe (e.g., subframe #(n+2)). In this case, a data retransmission latency may occur. In order to solve this problem, even when the decoding operation and feedback operation for the initial data (e.g., data I, II, III, and IV) are not completed, as in the exemplary embodiment illustrated in FIG. 16, the retransmission procedure for the data (e.g., data I, II, II, and IV) may be performed using a preconfigured retransmission resource.

Figure 18:
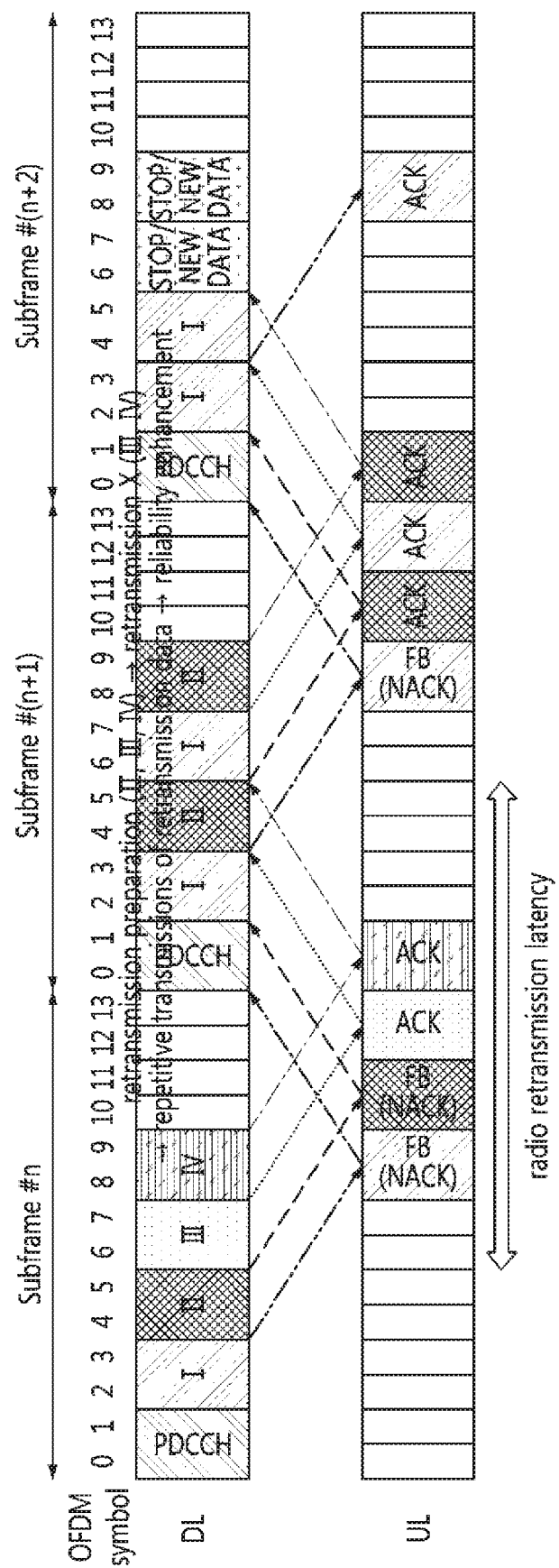
FIG. 18 is a timing diagram illustrating a ninth exemplary embodiment of a method for redundantly transmitting data in a communication system.

FIG. 18 is a timing diagram illustrating a ninth exemplary embodiment of a method for redundantly transmitting data in a communication system.

Referring to FIG. 18, when data I is not successfully received at the terminal (e.g., when NACK corresponding to the data I is received from the terminal), the base station may transmit the data I together with the data II in a retransmission procedure by using the subframe #(n+1). Here, NACK corresponding to the data II may be received before the retransmission procedure of the data I. Alternatively, the HARQ response corresponding to the data II may not be received before the retransmission procedure of the data I The terminal may receive the data in the subframes #n and #(n+1), combine the data received in the subframe #(n+1) with the data received in the subframe #n, and perform a decoding operation on the combining result. Further, the terminal may determine that the data received in the subframe #(n+1) is retransmission data or data transmitted through a preconfigured retransmission resource based on the HARQ response corresponding to the data received in the subframe #n. In this case, reception reliability of the data can be improved, and the retransmission latency can be reduced.

Alternatively, when NACK corresponding to the data I and II transmitted in the subframe #n are received (or HARQ responses for the data I and II are not received), and ACK corresponding to the data III and IV transmitted in the subframe #n are received, the base station may retransmit the data I and II by using retransmission resources of the data III and IV within the subframe #(n+1).

When it is determined that retransmission of the data I is required according to the HARQ responses corresponding to the data I and II transmitted in the subframe #(n+1), the base station may retransmit the data I by using a preconfigured retransmission resource within the subframe #(n+2). When ACK corresponding to the data I is received during retransmission of the data I in the subframe #(n+2), the base station may stop the retransmission procedure of the data I in the subframe #(n+2), and perform a transmission procedure of new data. In this case, even when ACK corresponding to the data I is transmitted, the terminal may transmit ACK corresponding to the redundantly-received data I again. Alternatively, the transmission of ACK corresponding to the redundantly-received data I may be omitted.

Figure 19:
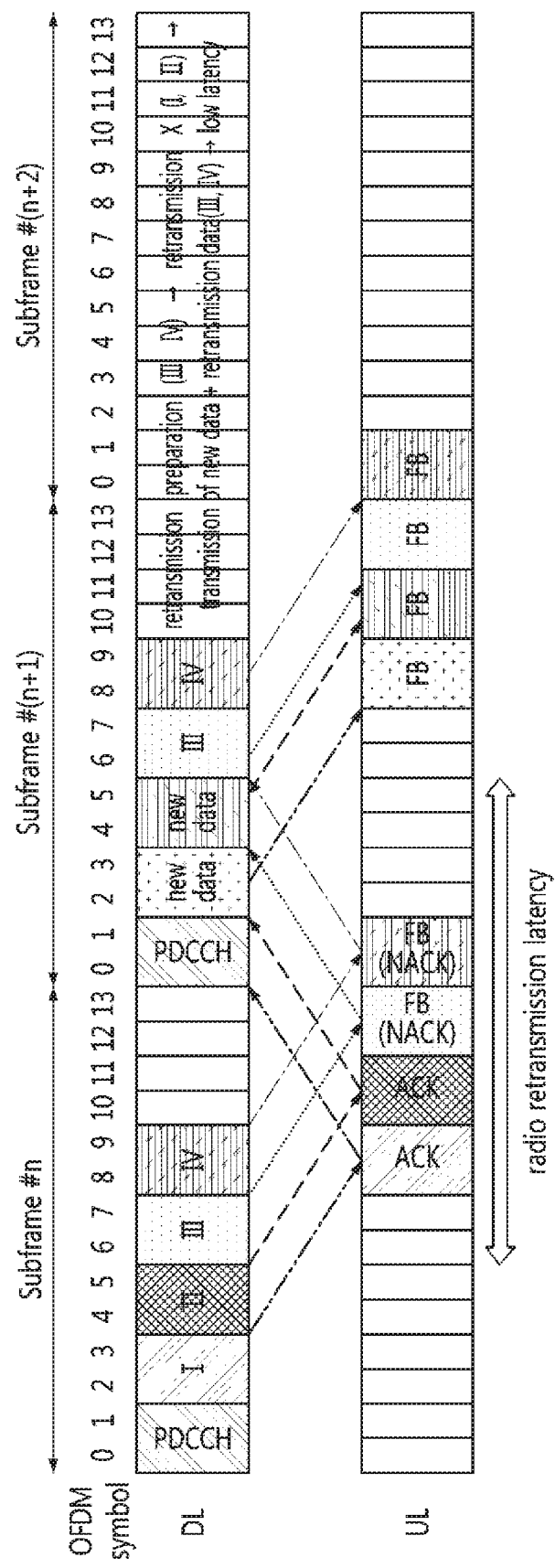
FIG. 19 is a timing diagram illustrating a tenth exemplary embodiment of a method for redundantly transmitting data in a communication system.

FIG. 19 is a timing diagram illustrating a tenth exemplary embodiment of a method for redundantly transmitting data in a communication system.

Referring to FIG. 19, when ACK corresponding to the data I and II transmitted in the subframe #n are received before a retransmission time, and NACK corresponding to the data III and IV transmitted in the subframe #n are received before the retransmission time, the base station may transmit new data by using retransmission resources for the data I and II within the subframe #(n+1). Alternatively, the base station may retransmit the data III and IV by using retransmission resources for the data I and II within the subframe #(n+1).

When the transmission characteristic of the data to be transmitted in the subframe #(n+1) is different from the transmission characteristic of the data transmitted in the subframe #n, the base station may transmit a downlink control channel (e.g., PDCCH) including transmission characteristic information (e.g., resource allocation information, MCS, RV, etc.) of the data in the subframe #(n+1). The terminal may perform a data reception operation based on the number of repetitive transmissions configured by the base station. When the data is successfully received from the terminal and the retransmission procedure of the data is not required, the base station may terminate resource allocation for redundant transmission of the data and transmit to the terminal information indicating that the resource allocation for redundant transmission has been terminated.

The terminal may perform a reception operation of resource allocation information (e.g., multiple resource allocation information) for redundant transmission based on the information received from the base station. Alternatively, the terminal may terminate the reception operation of the resource allocation information for redundant transmission based on the information received from the base station. When the data is not received based on the multiple resource allocation information or when the information indicating change or termination of the multiple resource allocation information is not received within a preconfigured time, the terminal may determine that the multiple resource allocation information is invalid.

The terminal may receive redundant transmission related information (e.g., information indicating allocation, change, and/or termination of multiple resources) from the base station, and transmit an HARQ response (e.g., ACK or NACK) for the redundant transmission related information to the base station. The base station may receive the HARQ response from the terminal, and may determine whether the redundant transmission related information has been successfully received at the terminal based on the HARQ response.

When ACK corresponding to the redundant transmission related information is not received, when NACK corresponding to the redundant transmission related information is received, or when the HARQ response corresponding to the redundant transmission related information is not received within a preconfigured time, the base station may determine that the redundant transmission related information has not been successfully received at the terminal. In this case, the base station may notify the terminal of the allocation, change, or termination of resources for the redundant transmission by performing a retransmission procedure of the redundant transmission related information or a transmission procedure of new redundant transmission related information.

1.2 Multiple Resource Allocation in Uplink

Figure 20A:
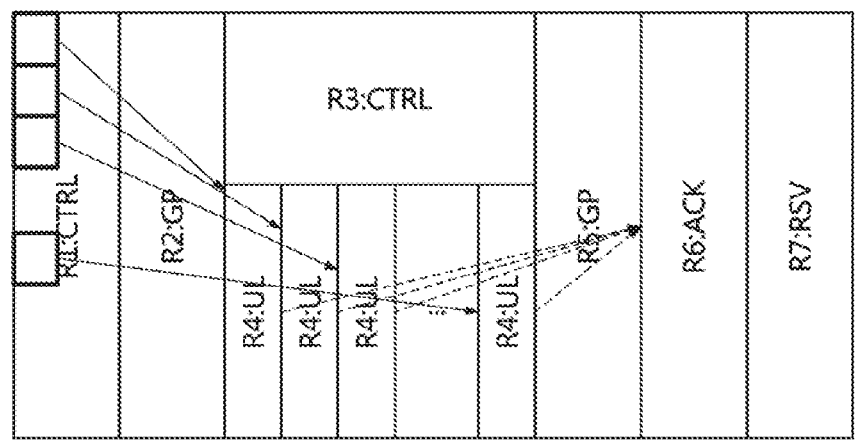
FIG. 20A is a conceptual diagram illustrating a first exemplary embodiment of an uplink multiple resource allocation method in an SC TDD-based communication system.
Figure 20B:
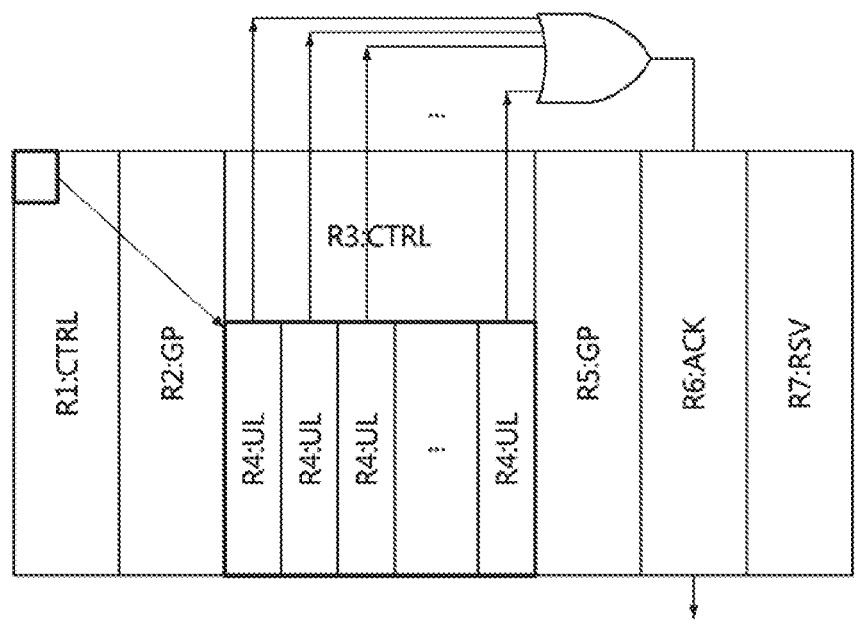
FIG. 20B is a conceptual diagram illustrating a second exemplary embodiment of an uplink multiple resource allocation method in an SC TDD-based communication system.
Figure 20C:
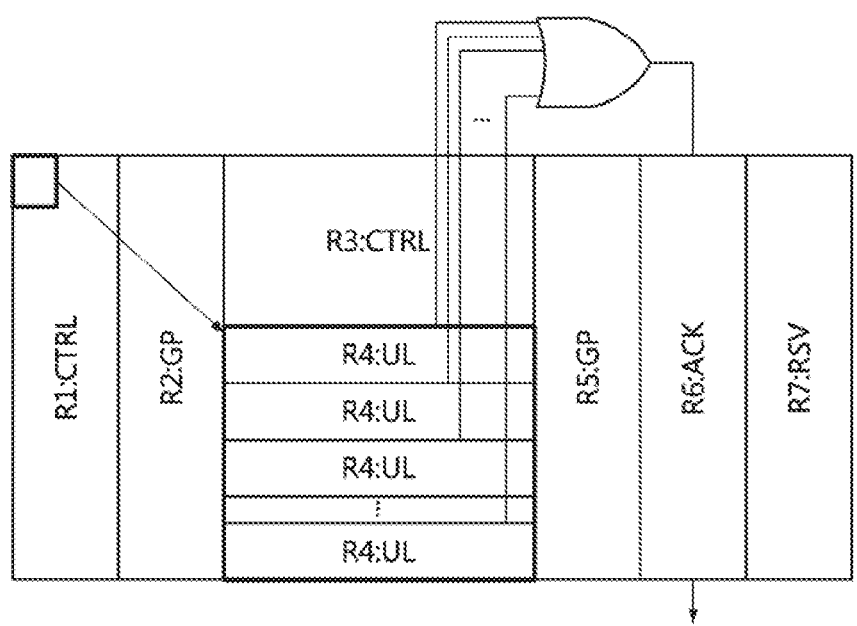
FIG. 20C is a conceptual diagram illustrating a third exemplary embodiment of an uplink multiple resource allocation method in an SC TDD-based communication system.

FIG. 20A is a conceptual diagram illustrating a first exemplary embodiment of an uplink multiple resource allocation method in an SC TDD-based communication system, FIG. 20B is a conceptual diagram illustrating a second exemplary embodiment of an uplink multiple resource allocation method in an SC TDD-based communication system, and FIG. 20C is a conceptual diagram illustrating a third exemplary embodiment of an uplink multiple resource allocation method in an SC TDD-based communication system.

The exemplary embodiments illustrated in FIGS. 20A to 20C may represent a method of continuously allocating resources, and may be usefully applied to SPS-based communication and CG-based communication. The exemplary embodiments illustrated in FIGS. 20A to 20C may be usefully applied to a scenario in which one transport block is transmitted a preconfigured number of times or a predetermined transport block is continuously transmitted a predetermined number of times.

In the exemplary embodiment illustrated in FIG. 20A, a downlink control channel (CTRL) may include resource allocation information for R4:UL within an uplink data channel (UL) (e.g., R3:CTRL, R4:UL). An HARQ response (e.g., ACK) corresponding to R4:UL within the uplink data channel (UL) may be transmitted on a downlink control channel (e.g., R6:ACK).

In the exemplary embodiment illustrated in FIG. 20B, a downlink control channel (CTRL) may include one resource allocation information for R4:UL within a uplink data channel (UL). The one resource allocation information may indicate R4:UL contiguous in the time domain within the uplink data channel (UL). In this case, the size of the downlink control channel (CTRL) (e.g., resource allocation information in the downlink control channel) may be reduced. In addition, a plurality of HARQ responses for R4:UL within the UL data channel (UL) may be transmitted as multiplexed, aggregated, or bundled. That is, one HARQ response corresponding to R4:UL within the UL data channel (UL) may be transmitted.

In the exemplary embodiment illustrated in FIG. 20C, a downlink control channel (CTRL) may include one resource allocation information for R4:UL within a plurality of uplink data channels (UL). The one resource allocation information may indicate a predetermined R4:UL (e.g., continuous R4: UL) in the frequency domain within the uplink data channel (UL). In this case, the size of the downlink control channel (CTRL) (e.g., DCI) may be reduced. In addition, a plurality of HARQ responses for R4:UL within the UL data channel (UL) may be transmitted as multiplexed, aggregated, or bundled. That is, one HARQ response corresponding to R4:UL within the UL data channel (UL) may be transmitted.

In addition, as in the exemplary embodiments illustrated in FIGS. 9A to 9C, uplink data may be redundantly/continuously transmitted by using continuously allocated resources. For example, as in the exemplary embodiment illustrated in FIG. 9A, a transport block generated based on the same uplink data may be repeatedly transmitted. As in the exemplary embodiment illustrated in FIG. 9B, uplink data having different RVs may be transmitted. In the exemplary embodiment illustrated in FIG. 9C, when the size of a transport block (TB) or code block (CB) is larger than the size of a mini-slot, the transport block (TB) or code block (CB) may be divided into a plurality of segments, and the plurality of segments (e.g., segments #0 to #N) may be transmitted. A redundant data transmission method based on the multiple resource allocation scheme may be configured through at least one of a higher layer message, MAC CE, and DCI.

In particular, in the exemplary embodiments illustrated in FIGS. 20B and 20C, a plurality of mini-slots may be scheduled by one resource allocation information. In this case, the terminal may repeatedly transmit the same data by using the plurality of mini-slots scheduled by one resource allocation information. A resource allocation unit may be a unit of a symbol, a unit of n symbols, a unit of a mini-slot comprising n symbols, or a unit of a slot comprising n symbols or mini-slots. Here, n may be an integer equal to or greater than 1. When n is 1, repetitive transmission in the frequency domain may be performed within one resource allocation unit in the time domain. The above-described exemplary embodiments may be applied not only to the SC TDD-based communication system, but also to the FDD-based communication system, the dynamic TDD-based communication system, and the communication system supporting an unlicensed band. Also, the resource allocation information may be transmitted through one or more of a higher layer messages, MAC CE, and DCI.

Meanwhile, a resource allocation scheme for redundant/continuous transmission may be as follows.
- A scheme in which mini-slots are continuously allocated over time in a previous resource (e.g., subframe or slot)
- A scheme in which mini-slots are allocated at preconfigured intervals over time in a previous resource (e.g., subframe or slot)
- A scheme in which mini-slots are continuously allocated for each resource unit (e.g., subframe or slot) composed of n mini-slots. Here, n is an integer equal to or greater than 1.
- A scheme in which min-slots are allocated to a plurality of resource units when a resource unit includes n mini-slots. The allocation position of the mini-slot in each of the plurality of resource units may be the same. Here, n is an integer equal to or greater than 1.

The base station may transmit resource allocation information for the mini-slot to the terminal. The terminal may identify the allocated mini-slot based on the resource allocation information received from the base station. A configuration parameter for the resource allocation scheme may be transmitted through at least one of an RRC message, MAC CE, and downlink control channel. The resource allocation information may include information for identifying resources within a slot or subframe in the time or frequency domain.

The resource allocation information may include an interval (e.g., K2 in Table 3) between a control channel including the resource allocation information and a slot indicated by the resource allocation information, a symbol offset S from the control channel within the slot, the length L (e.g., the length of the mini-slot (e.g., the number of OFDM symbols, the number of REs, the size of CB, etc.)), the number N of resources allocated repeatedly/continuously, and the like. The configuration value for the resource allocation scheme may additionally include information for data transmission and reception (e.g., MCS, TB/CB size, HARQ information, RNTI, etc.).

The information for data transmission and reception may be transmitted from the base station to the terminal by using one or more of an RRC message, a MAC CE, and a downlink control channel, together with the configuration value for the resource allocation scheme. Alternatively, the information for data transmission and reception may be transmitted from the base station to the terminal by using one or more of an RRC message, a MAC CE, and a downlink control channel, separately from the configuration value for the resource allocation scheme. In the TDD-based communication system in which downlink and uplink coexist, the resource allocation scheme described above may be applied only to a region used for uplink. In addition, the resource allocation scheme may be valid from an end time of the uplink region to a start time of a downlink region. The same resource allocation scheme may be applied to the current uplink region and the next uplink region.

Hereinafter, exemplary embodiments of the repeated/continuous resource allocation scheme will be described.

Figure 21:
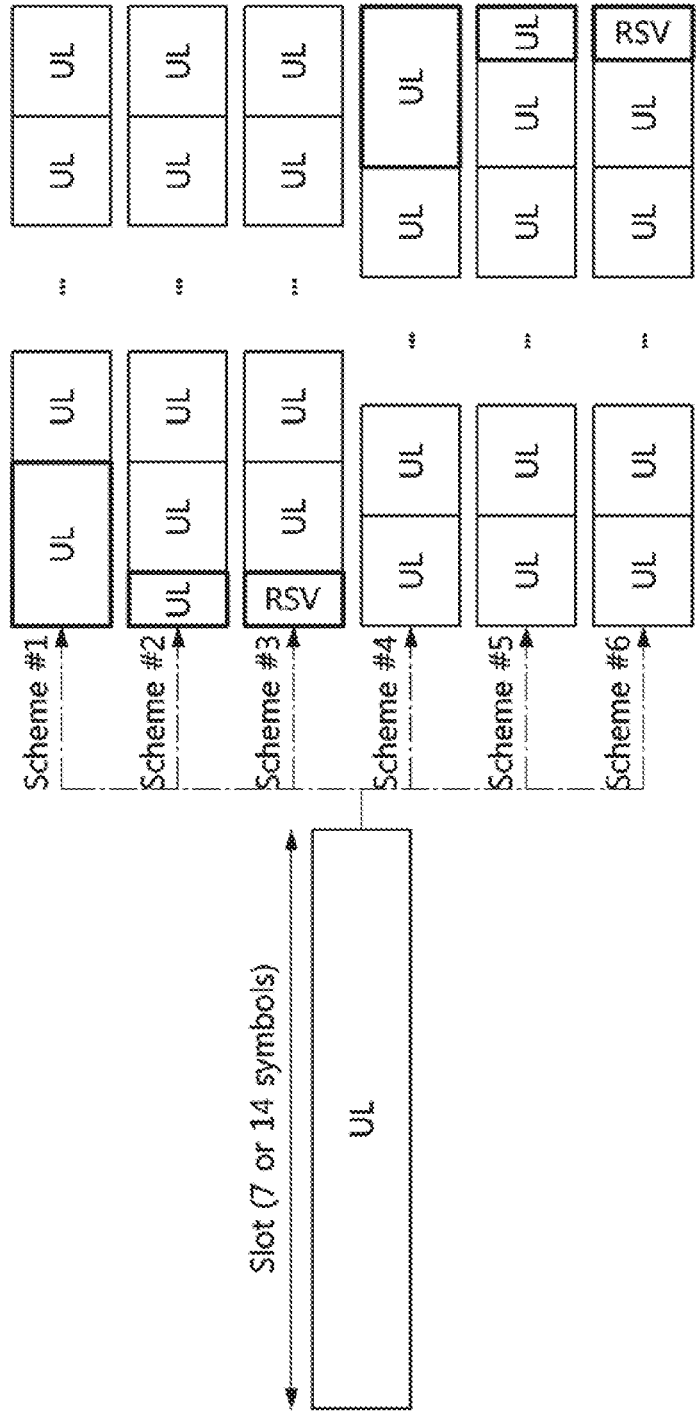
FIG. 21 is a conceptual diagram illustrating a first exemplary embodiment of a continuous/repeated uplink data channel allocation method in a communication system.

FIG. 21 is a conceptual diagram illustrating a first exemplary embodiment of a continuous/repeated uplink data channel allocation method in a communication system.

Referring to FIG. 21, the base station may transmit each repeated/continuous resource allocation information to the terminal, and the terminal may perform a related operation based on the resource allocation information received from the base station.

In the first exemplary embodiment of the resource allocation scheme, L OFDM symbols from a symbol spaced apart from the control channel by S symbols may be repeatedly/continuously allocated in N units. When a resource M to be repeatedly/continuously allocated (e.g., slot or mini-slot shown in FIG. 21) is larger or smaller than N×L, a resource allocation scheme therefor may be required. For example, the resource allocation scheme may be as follows.

L OFDM symbols may be allocated within the first to (N−1)-th resources (e.g., mini-slot), and M−(N−1)×L OFDM symbols may be allocated within the N-th resource. Here, among all REs included in the resource M corresponding to L OFDM symbols instead of one OFDM symbol, REs used for data transmission may be divided into N parts, and the divided REs may be used. In this case, REs (i.e., REs available for data transmission) that are not used for a specific purpose (e.g., sounding reference signal (SRS), physical random access channel (PRACH), physical uplink channel (PUCCH), reference signal, etc.) among the REs may be allocated/divided for data transmission.

In the second exemplary embodiment of the resource allocation scheme, L OFDM symbols starting from a symbol spaced apart from the control channel by S symbols may be used as a resource M to be allocated repeatedly/continuously, and the resource M may be divided into N parts. The N resources may be used as repeated/continuous resource (e.g., mini-slot). The resources may be allocated in units of LN symbols. Accordingly, the first to (N−1)-th resources may be allocated equally based on $\lceil L/N \rceil$ or $\lfloor L/N \rfloor$. Since the N-th resource is allocated based on $L-\lceil L/N \rceil$ or $L-\lfloor L/N \rfloor$, the N-th resource may be allocated differently from the first to (N−1)-th resources.

Here, among all REs included in the resource M corresponding L OFDM symbols instead of one OFDM symbol, REs used for data transmission may be divided into N parts, and the N resources may be used as repeated/continuous resources. In this case, REs that are not used for a specific purpose (e.g., SRS, PRACH, PUCCH, reference signal, etc.) among the REs may be allocated/divided for data transmission.

When the repeated/continuous resources are allocated (or divided), the resources divided differently may be as follows.

Schemes #1~#3

The lengths (e.g., the number of symbols) of the remaining resources excluding the first resource among the resources belonging to the slot (or, subframe, allocation unit of continuous resources) may be configured to be the same. For example, when the slot includes 14 symbols and a configuration unit of the repeated/continuous resource (e.g., mini-slot) is 3 symbols, the first resource within the slot in the scheme #1 illustrated in FIG. 21 may be composed of 5 symbols, the first resource within the slot in the scheme #2 illustrated in FIG. 21 may be composed of 2 symbols, and the first resource within the slot in the scheme #3 illustrated in FIG. 21 may be composed of 2 symbols. Therefore, the first resource may not be used as the repeated/continuous resource. The remaining resources excluding the first resource among all resources may be allocated in units of 3 symbols. That is, the remaining resources may be allocated repeatedly/continuously in units of 3 symbols. In particular, in the TDD-based communication system, the first resource may be used as a GP or SG for switching between downlink and uplink (i.e., RF change). Alternatively, the first resource may be used as a processing time for generating feedback corresponding to a previous data service.

Scheme #4

When the length (e.g., the number of symbols) of the last resource among resources belonging to the slot (or, subframe, allocation unit of continuous resources) is shorter than the length of other resources, the last resource (e.g., N-th resource) and a resource (e.g., (N−1)-th resource) before the last resource may be integrated into one resource. For example, when the slot is composed of 14 symbols and a configuration unit of the repeated/continuous resource (e.g., mini-slot) is 3 symbol, the last resource within the slot may be composed of 5 symbols, and the remaining resources except the last resource among all the resources may be allocated in units of 3 symbols. That is, the remaining resources may be allocated repeatedly/continuously in units of 3 symbols.

Scheme #5

The length (e.g., the number of symbols) of the last resource among resources belonging to the slot (or, subframe, allocation unit of continuous resources) may be configured to be shorter than the length of other resources. For example, when the slot is composed of 14 symbols, and a configuration unit of the repeated/continuous resource (e.g., mini-slot) is 3 symbols, the last resource within the slot may be composed of 2 symbols, and the remaining resources excluding the last resource among all the resources may be allocated in units of 3 symbols. That is, the remaining resources may be allocated repeatedly/continuously in units of 3 symbols.

Scheme #6

When the length (e.g., the number of symbols) of the last resource among resources belonging to the slot (or, subframe, allocation unit of continuous resources) is shorter than the length of other resources, the last resource may not be used for data transmission. For example, when the slot is composed of 14 symbols and a configuration unit of the repeated/continuous resource (e.g., mini-slot) is 3 symbols, since the last resource within the slot is composed of 2 symbols, the last resource may not be used as the repeated/continuous resource. The remaining resources excluding the last resource among all the resources may be allocated in units of 3 symbols. That is, the remaining resources may be allocated repeatedly/continuously in units of 3 symbols.

In particular, in the schemes #5 and #6, the last mini-slot may be used for a processing time of uplink transmission through a mini-slot before the last mini-slot, transmission of uplink control information (e.g., channel measurement information, scheduling request (SR)), or SRS transmission.

Meanwhile, in general, reference signals used for channel measurement, channel estimation, demodulation, and the like may be arranged in various patterns according to configuration of resources used for data transmission. In this case, RE mapping schemes having different patterns may be applied to the repeated/continuous resources. In this case, accurate configuration/operation between the base station and the terminal may be required. To this end, reference signals having the same pattern may be mapped to N resources belonging to the resource M included in L OFDM symbols or resources according to a preconfigured interval within the repeatedly/continuously allocated resource. Alternatively, when the entire resource M is determined to be one resource, the reference signal may be configured with a unique pattern within the entire resource M.

When a control channel (e.g., a mini-slot specific downlink control channel or CORESET) is included in each resource (e.g., mini-slot), the base station may transmit to the terminal a general downlink control channel (e.g., PDCCH) including resource allocation information of a mini-slot specific downlink control channel as well as resource allocation information of a resource (e.g., PDSCH) used as the repeated/continuous resource. In this case, the resource allocation information for the repeated/continuous resource may be transmitted through the mini-slot specific downlink control channel instead of a PDCCH.

In another method, the terminal may identify resource allocation information for the repeated/continuous resource based on the resource allocation information (e.g., frequency resource allocation information) of the mini-slot specific downlink control channel included in the PDCCH received from the base station. For example, a frequency resource of the mini-slot specific downlink control channel may be configured to be the same as a frequency resource for the repeated/continuous resource, and data may be transmitted and received through the repeated/continuous resource.

Figure 22:
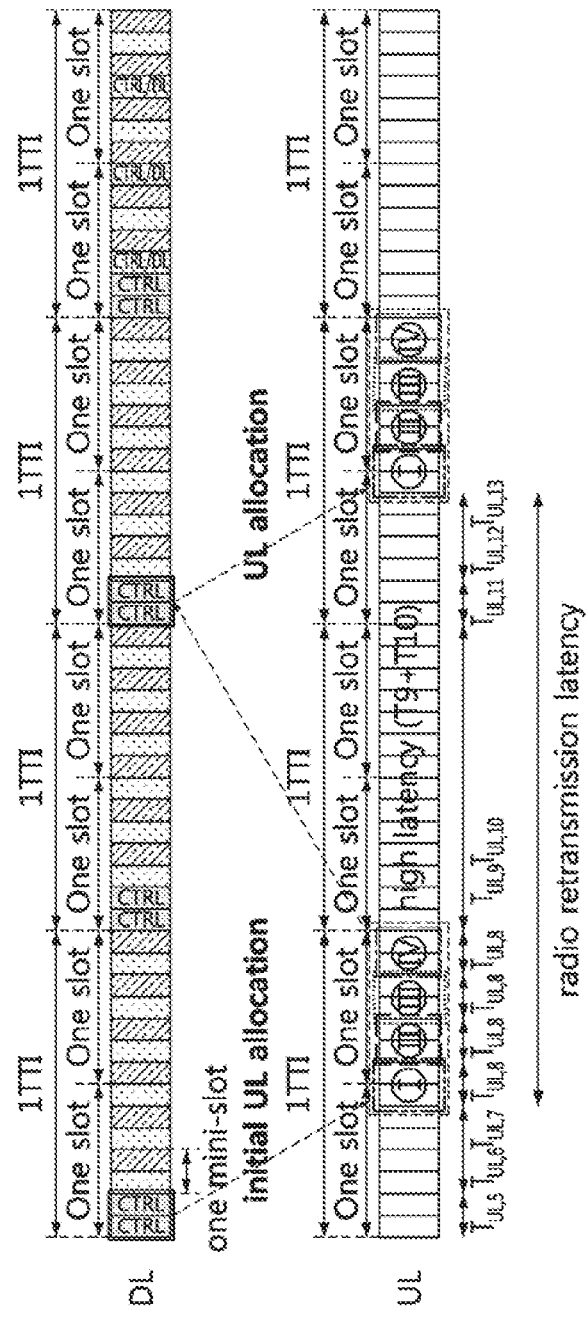
FIG. 22 is a timing diagram illustrating an eleventh exemplary embodiment of a method for redundantly transmitting data in a communication system.

FIG. 22 is a timing diagram illustrating an eleventh exemplary embodiment of a method for redundantly transmitting data in a communication system.

Referring to FIG. 22, a resource allocation unit may be a predetermined number (e.g., 2) of mini-slots, and the two mini-slots, which are a resource allocation unit, may be referred to as a 'mini-slot set.' The base station may transmit resource allocation information indicating mini-slot sets (e.g., I, II, III, and IV) used for redundant data transmission through a downlink control channel (CTRL). The terminal may receive the downlink control channel (CTRL) from the base station, and transmit data (e.g., TB or CB) to the base station in the mini-slot sets I, II, III, and IV indicated by the resource allocation information included in the downlink control channel (CTRL).

Here, each of $T_{UL,5}$, $T_{UL,6}$, $T_{UL,7}$, $T_{UL,8}$, $T_{UL,9}$, $T_{UL,10}$, $T_{UL,11}$, $T_{UL,12}$, and $T_{UL,13}$ may be the same as each of $T_{UL,2}$, $T_{UL,6}$, $T_{UL,7}$, $T_{UL,8}$, $T_{UL,9}$, $T_{L,10}$, $T_{UL,11}$, $T_{UL,12}$, and $T_{UL,13}$ in the exemplary embodiment illustrated in FIG. 6, respectively. The base station may transmit a higher layer message, a MAC CE, and/or a downlink control channel including information indicating the number of repetitive transmissions of data (or repetitive transmission duration, the number of mini-slot sets, and the duration of the mini-slot sets).

The terminal may repeatedly transmit the data by using the resources allocated by the base station. The base station may receive the data from the terminal, perform a decoding operation on all data instead of one data, and transmit an HARQ response resulting from the decoding operation to the terminal. Alternatively, resources may be allocated for data retransmission or new data transmission based on the result of the decoding operation. Here, one or more data received from the base station may be combined, and the decoding operation on the combined data may be performed.

The NDI and RV for the data transmitted redundantly by the terminal may be configured by the base station. For example, the NDI and RV may be included in the mini-slot specific downlink control channel. In this case, the base station may transmit to the terminal resource allocation information (e.g., the same HARQ process ID and NDI as those of previous data) for uplink data retransmission together with the HARQ response. Alternatively, the base station may transmit resource allocation information for uplink data retransmission to the terminal instead of the HARQ response. Alternatively, the base station may transmit resource allocation information (e.g., NDI toggle, new HARQ process ID) for new uplink data transmission to the terminal.

In addition, the terminal may continuously transmit different data instead of the same data using uplink resources allocated by the base station. That is, the same data having the same HARQ process ID may be transmitted as configured with the same RV, different RVs, or a certain pattern of RVs. Alternatively, different data having different HARQ process IDs may be transmitted as configured with the same RV, different RVs, or a certain pattern of RVs. In this case, the base station may transmit an HARQ response and/or data (re)allocation information for each of the data to the terminal.

Meanwhile, in the exemplary embodiment illustrated in FIG. 22, the terminal may perform a data retransmission procedure based on the feedback result (e.g., HARQ response) of the base station or resource allocation information of retransmission data. A latency from a reception time of the feedback result to a transmission time of a downlink control channel including the resource allocation information of retransmission data (e.g., data retransmission latency) may be $T_{DL,9}+T_{DL,10}$ (i.e., T9+T10). Each time unit of $T_{DL,5}$ to $T_{DL,13}$ may be a symbol unit. Each of $T_{DL,5}$ to $T_{DL,13}$ may increase or decrease depending on the implementation or configuration. In this case, the retransmission time of the data may be changed.

In the data retransmission procedure, a time for the decoding operation of the feedback result (e.g., HARQ response), a time for the generation operation (e.g., encoding operation) for the downlink control channel, and a time for the generation operation (e.g., encoding operation) for the uplink data channel (e.g., uplink data channel including the retransmission data) may be required. However, due to transmission restrictions of the downlink control channel (e.g., the downlink control channel is transmitted from the first symbol within the TTI), unnecessary latency (e.g., T9+T10) may occur.

In order to solve this problem, the terminal may perform a parallel processing operation on the data received from the base station. The parallel processing operation may be performed as in the exemplary embodiment illustrated in FIG. 13. For example, the terminal may repeatedly transmit data, and the base station may receive a plurality of data from the base station. In this case, data reception processing operations (e.g., RF reception (RX), fast Fourier transform (FFT), demodulation (Dem), and decoding including forward error correction (FEC)) may be performed in parallel processing units (e.g., mini-slot sets I to IV shown in FIG. 22, preconfigured number of symbols, TTIs, slots) instead of data units. In the exemplary embodiment illustrated in FIG. 22, the data reception processing operations may be performed in parallel, and in this case, a method of redundantly transmitting data may be as follows.

Figure 23:
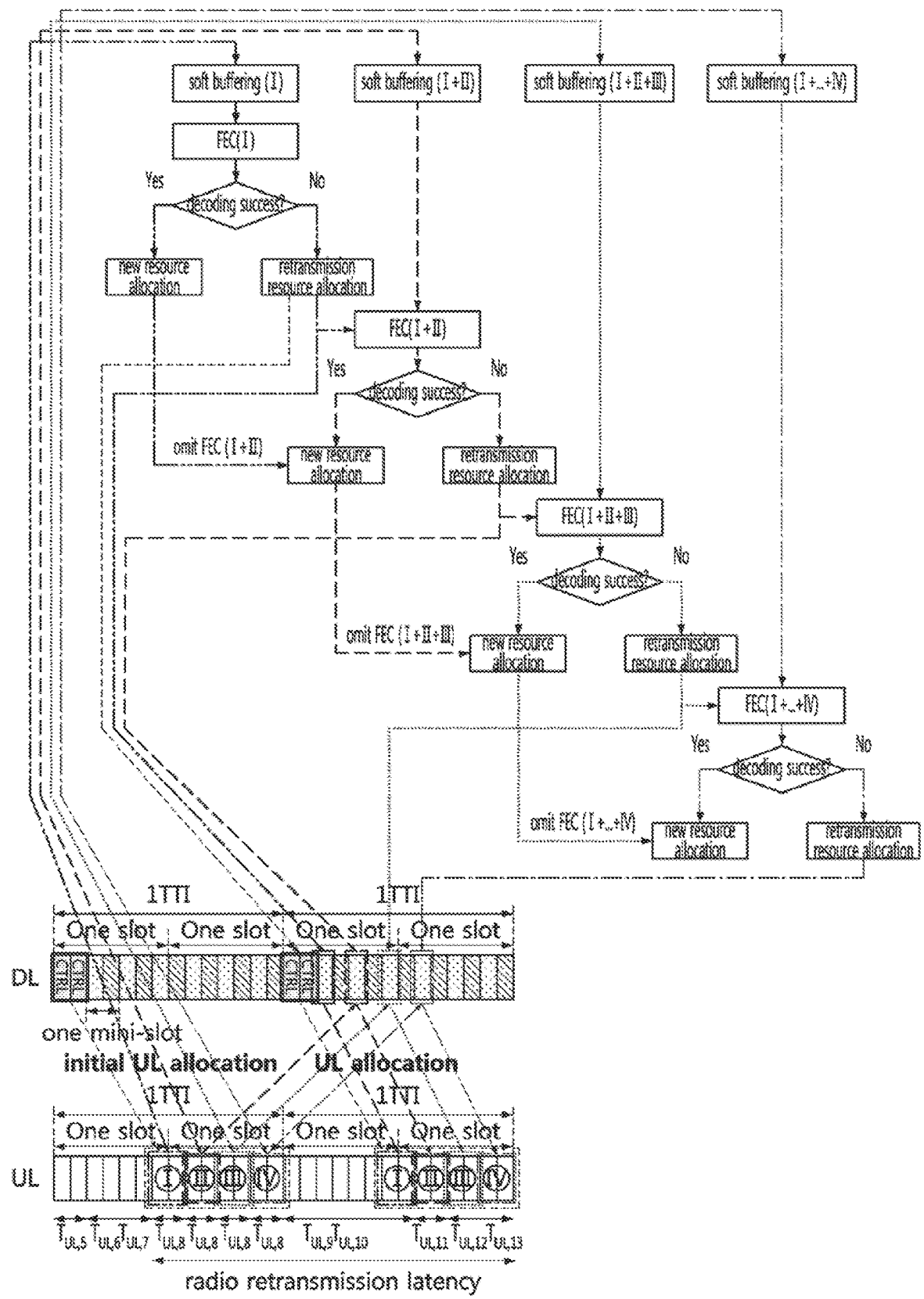
FIG. 23 is a timing diagram illustrating a twelfth embodiment of a method for redundantly transmitting data in a communication system.

FIG. 23 is a timing diagram illustrating a twelfth embodiment of a method for redundantly transmitting data in a communication system.

Referring to FIG. 23, the base station may perform a data reception processing operation (e.g., RF RX, FFT, Dem, and decoding including FEC) of the data I received in the mini-slot set I. The base station may generate ACK or NACK according to a result of the decoding, and may transmit ACK or NACK to the terminal. When the decoding result is NACK, the base station may transmit resource allocation information for retransmission data to the terminal. Alternatively, when the decoding result is ACK, the base station may transmit resource allocation information for new data to the terminal or terminate the uplink data transmission procedure. The terminal may receive ACK and the resource allocation information for new data from the base station, and transmit the new data to the base station by using transmission parameters (e.g., MCS, transmission power) used for previous data transmission, in resources indicated by the resource allocation information When the base station wants to terminate the uplink data transmission procedure without allocating resources for new data, the base station may transmit to the terminal information indicating that the uplink data transmission procedure is terminated instead of the resource allocation information for new data. When NACK is received from the base station or when an HARQ response (e.g., ACK or NACK) is not received from the base station within a preconfigured time, the terminal may retransmit the data by using transmission parameters (e.g., time and frequency resources, MCS, and transmission power) used for the previous data transmission. Alternatively, the terminal may transmit a scheduling request (SR) requesting an uplink resource for new data or retransmission data to the base station.

The base station may perform a reception processing operation (e.g., RF RX, FFT, Dem, and decoding including FEC) of the data II obtained from the mini-slot set II. Here, the decoding operation may be performed on the data I obtained from the mini-slot set I and the data II obtained from the mini-slot set II. For example, the data II obtained from the mini-slot set II may be combined with the data I obtained from the mini-slot set I, and a decoding operation on the combining result may be performed.

When the result of the decoding operation on the data I obtained from the mini-slot set I is ACK, the base station may terminate the data reception processing operation even before the termination of the decoding operation for the subsequent data II to IV. When necessary, the base station may transmit ACK to the terminal. Alternatively, when the result of the decoding operation on the data I obtained from the mini-slot set I is ACK, the data reception processing operation in the remaining mini-slot sets II to IV may be skipped. That is, HARQ responses corresponding to the data II to IV transmitted in the remaining mini-slot sets II to IV may not be received at the terminal.

When it is determined that the data has been successfully received in the previous data reception processing operation, the base station may not perform the subsequent data reception processing operation. On the other hand, when it is determined that the data has not been successfully received in the previous data reception processing operation, the base station may perform a decoding operation on newly acquired data and the data obtained in the previous data reception processing operation.

The terminal may receive resource allocation information for uplink transmission from the base station, and may perform an uplink data (re)transmission procedure by using resources indicated by the resource allocation information. When ACK or resource allocation information for new uplink transmission (e.g., second uplink transmission) is received from the base station, instead of resource allocation information for uplink transmission (e.g., first uplink transmission), the terminal may determine that the data has been successfully received at the base station, and may terminate the first uplink data transmission procedure.

When NACK is not received from the base station or when the HARQ response (e.g., ACK or NACK) is not received from the base station within a preconfigured time, the terminal may expect to receive resource allocation information for new data or retransmission data from the base station. When the resource allocation information is received from the base station, the terminal may perform an uplink data (re)transmission procedure by using resources indicated by the resource allocation information. Alternatively, the terminal may transmit an SR requesting resource allocation for uplink transmission to the base station.

When NACK or the resource allocation information is received from the base station, the terminal may retransmit data within a preconfigured time. Alternatively, the terminal may retransmit the data by using transmission parameters (e.g., time and frequency resources, MCS, transmission power) used for the previous data transmission. Alternatively, when the HARQ response (e.g., ACK or NACK) or the resource allocation information is not received from the base station, the terminal may retransmit the data within a preconfigured time. Alternatively, the terminal may retransmit the data by using transmission parameters (e.g., time and frequency resources, MCS, transmission power) used for the previous data transmission.

When retransmission of the data is required, the base station may transmit NACK or resource allocation information (e.g., RV, MCS) for retransmission data to the terminal. The resource allocation information for retransmission data may be different from the resource allocation information for previous data (e.g., initial data). When the data is successfully received at the base station, the base station may transmit ACK to the terminal. Alternatively, the base station may transmit resource allocation information for new data to the terminal instead of ACK. The terminal may receive ACK or the resource allocation information for new data from the base station, and in this case, the terminal may terminate the previous data transmission procedure. Alternatively, the base station may transmit information indicating the termination of the uplink data transmission procedure to the terminal instead of ACK and resource allocation information for new data. When the information indicating the termination of the uplink data transmission procedure is received from the base station, the terminal may terminate the uplink data transmission procedure.

Unlike the exemplary embodiment illustrated in FIG. 22, in the exemplary embodiment illustrated in FIG. 23, the HARQ response corresponding to each data may be transmitted. The data reception processing operation of the base station according to the exemplary embodiments illustrated in FIGS. 13 and 23 may be performed as follows.

FIG. 24 is a conceptual diagram illustrating a second exemplary embodiment of a data reception processing operation in a communication system.

Referring to FIG. 24, when data is not successfully received from the terminal, the base station may temporarily store the corresponding data and receive retransmission data (or repetitive transmission data) from the terminal. The terminal may combine the retransmission data and the stored previous data, and perform an FEC operation on the combined data. When the data I, II, III, and IV are initial data, the data V, VI, VII, and VIII are retransmission data, and the data V is received after failing to receive the data I, II, III, and IV, the base station may combine the data V with at least one of the data I, II, III, and IV, and perform a FEC operation (e.g., decoding operation) on the combined data. The base station may transmit an HARQ response (ACK or NACK) according to a result of the FEC operation to the terminal.

For example, when the result of the FEC operation is ACK, the base station may transmit to terminal resource allocation information for new data or information indicating termination of the uplink data transmission procedure together with ACK. Alternatively, the base station may transmit the resource allocation information for new data or the information indicating termination of the uplink data transmission procedure to the terminal without transmitting ACK. On the other hand, when the result of the FEC operation is NACK, the base station may transmit to the terminal resource allocation information for retransmission data together with NACK. Alternatively, the base station may transmit the resource allocation information for retransmission data to the terminal without transmitting NACK.

When the HARQ response or resource allocation information is not received from the base station, the terminal may transmit the data to the base station by using transmission parameters (e.g., time and frequency resources, MCS, transmission power) used for transmission of previous data. The above method may also be applied to data reception processing operations for the data VI, VII, and VIII, in which case the data transmission rate can be improved. Also, the base station may inform the terminal that the uplink data transmission procedure is terminated by using one or more of the following methods.

Method 1: The base station transmits ACK to the terminal.
Method 2: The base station transmits resource allocation information for new data to the terminal.
Method 3: The base station transmits information indicating termination of the uplink data transmission procedure to the terminal.

Meanwhile, when the HARQ response (e.g., feedback) for each data is received as in the exemplary embodiment illustrated in FIG. 23, the terminal may determine whether to perform a data retransmission procedure based on the HARQ response received before the retransmission latency (e.g., T9+T10). When it is determined that retransmission of the data is necessary (e.g., when NACK is received), the terminal may perform a data retransmission procedure. On the other hand, when it is determined that retransmission of the data is not necessary (e.g., when ACK is received), the terminal may perform a new data transmission procedure or terminate the data transmission procedure. For example, when one or more of the following conditions are satisfied, the terminal may perform a data retransmission procedure.

Condition 1: When the HARQ response corresponding to the data I is NACK
Condition 2: When the HARQ response corresponding to the data I is not received within a preconfigured time
Condition 3: When the HARQ response corresponding to the data (e.g., data II) after the data I is not received before a resource allocation time for retransmission of the data I When ACK is received from the base station during the execution of the data retransmission procedure, when the resource allocation information for new data is received from the base station, or when the information indicating termination of the uplink data transmission procedure is received from the base station, the terminal may stop the data retransmission procedure. Alternatively, the terminal may transmit a signal (e.g., zero padding) indicating that ACK has been successfully received or transmit new data. For reception of new data (e.g., data III), the terminal may transmit a downlink control channel or MAC CE (e.g., MAC CE header) including information (e.g., NDI toggle) indicating that an uplink data transmission procedure for the new data is to be initiated before reception of the new data.

When the resource allocation information for new data or information indicating termination of the uplink data transmission procedure is not received from the base station within a preconfigured time, the terminal may transmit an SR requesting resource allocation for transmission of the new data to the base station. Alternatively, until reception of the resource allocation information for new data or the information indicating termination of the uplink data transmission procedure, the terminal may assume that the transmission parameters (e.g., time and frequency resources, MCS, transmission power) used for transmission of the previous data are valid, and transmit the data by using the valid transmission parameters. In particular, when ACK is received from the base station, the terminal may transmit the new data to the base station by using pre-allocated uplink resources. When there is no new data, the terminal may transmit to the base station a specific signal (e.g., zero padding) indicating that there is no new data.

Meanwhile, when a plurality of downlink control channels (or MAC CEs) including information indicating change or termination of multiple resource allocation are received, the terminal may determine that the multiple resource allocation is changed or terminated based on information included in the most recently received downlink control channel (or MAC CE) or an arbitrary downlink control channel (or MAC CE). When an indicator indicating a (re)allocation, change, or termination of a resource based on the preconfigured multiple resource allocation information is not received from the base station, the terminal may determine that the multiple resource allocation information is invalid.

Since new data transmission is expected when the multiple resource allocation is changed, the terminal may transmit an HARQ response corresponding to the downlink control channel including the information indicating start, change, and/or termination of the multiple resource allocation to the base station. Alternatively, the terminal may transmit new data to the base station instead of the HARQ response corresponding to the downlink control channel. That is, the HARQ response to the downlink control channel may be replaced with new data.

The terminal may receive redundant transmission related information (e.g., information indicating allocation, change, and/or termination of multiple resources) from the base station, and transmit an HARQ response (e.g., ACK or NACK) for the redundant transmission related information to the base station. The base station may receive the HARQ response from the terminal, and may determine whether the redundant transmission related information has been successfully received at the terminal based on the HARQ response.

When ACK corresponding to the redundant transmission related information is not received, when NACK corresponding to the redundant transmission related information is received, or when the HARQ response corresponding to the redundant transmission related information is not received within a preconfigured time, the base station may determine that the redundant transmission related information has not been successfully received at the terminal. In this case, the base station may notify the terminal of the allocation, change, or termination of resources for redundant transmission by performing a retransmission procedure of the redundant transmission related information or a transmission procedure of new redundant transmission related information. When a plurality of redundant transmission related information is received, the terminal may perform a redundant transmission related operation based on information indicated by the most recent redundant transmission related information.

In order to reduce retransmission latency (e.g., T9 ($T_{UL,9}$)+T10 ($T_{UL,10}$)) when data retransmission is required in the exemplary embodiment illustrated in FIG. 19, the retransmission latency may be reduced by retransmitting the data using a pre-allocated resource (e.g., subframe #(n+1)) even when a decoding operation/feedback operation/retransmission operation for initial data (e.g., data I to IV in the subframe #n) is not completed.

Figure 25:
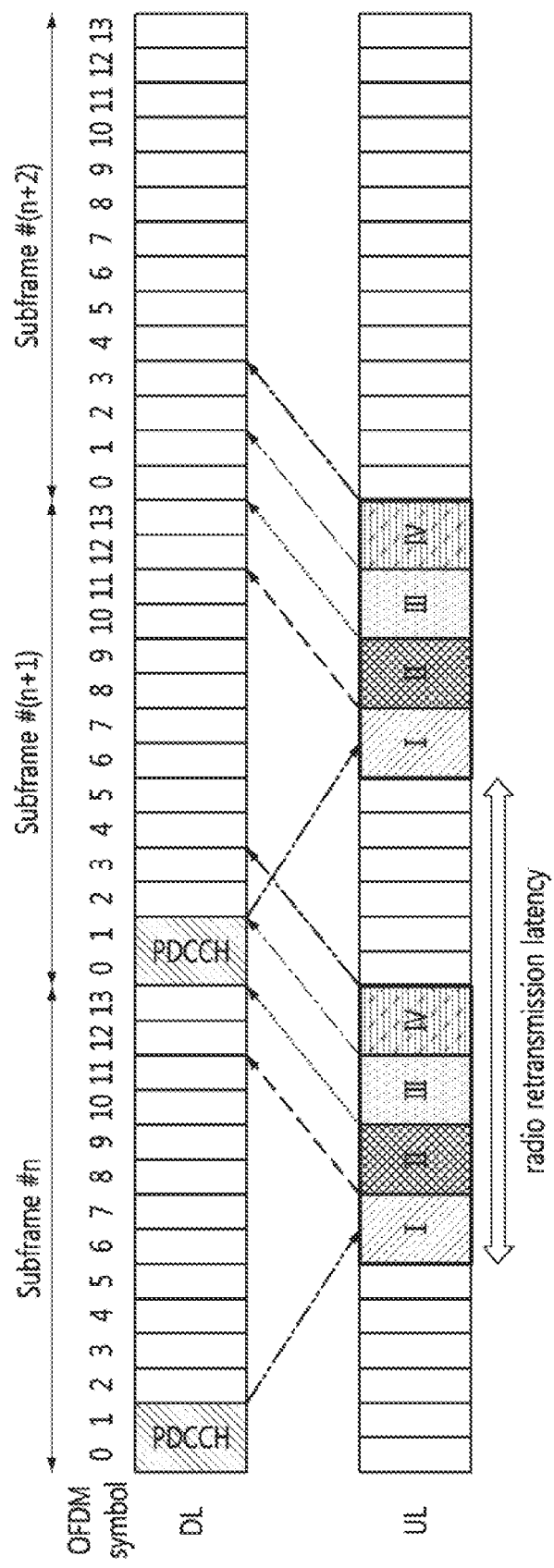
FIG. 25 is a timing diagram illustrating a thirteenth exemplary embodiment of a method for redundantly transmitting data in a communication system.

FIG. 25 is a timing diagram illustrating a thirteenth exemplary embodiment of a method for redundantly transmitting data in a communication system.

Referring to FIG. 25, when initial data (e.g., data I to IV) are transmitted in the subframe #n, and a retransmission time according to an HARQ response corresponding to the initial data (e.g., data I to IV) is the subframe #(n+k), a retransmission resource may be allocated before the subframe #(n+k), and retransmission resource allocation information may be transmitted before the subframe #(n+k). For example, the retransmission resource may be configured in the subframe #(n+l) (here, l is an integer equal to or smaller than k).

In this case, the terminal may retransmit the data using the retransmission resource after the initial data transmission. In this case, the above-described redundant/continuous data transmission method using continuously allocated resources may be applied. For example, the same data (e.g., TB or CB) may be repeatedly transmitted as in the exemplary embodiment shown in FIG. 9A. Alternatively, as the exemplary embodiment illustrated in FIG. 9B, the TB/CB having the same HARQ processor ID may be divided into data having different RVs or data having a preconfigured pattern of RVs, and the data having different RVs or the data having the preconfigured pattern of RVs may be continuously transmitted. Alternatively, the segments may be continuously transmitted as in the exemplary embodiment illustrated in FIG. 9C.

Figure 26:
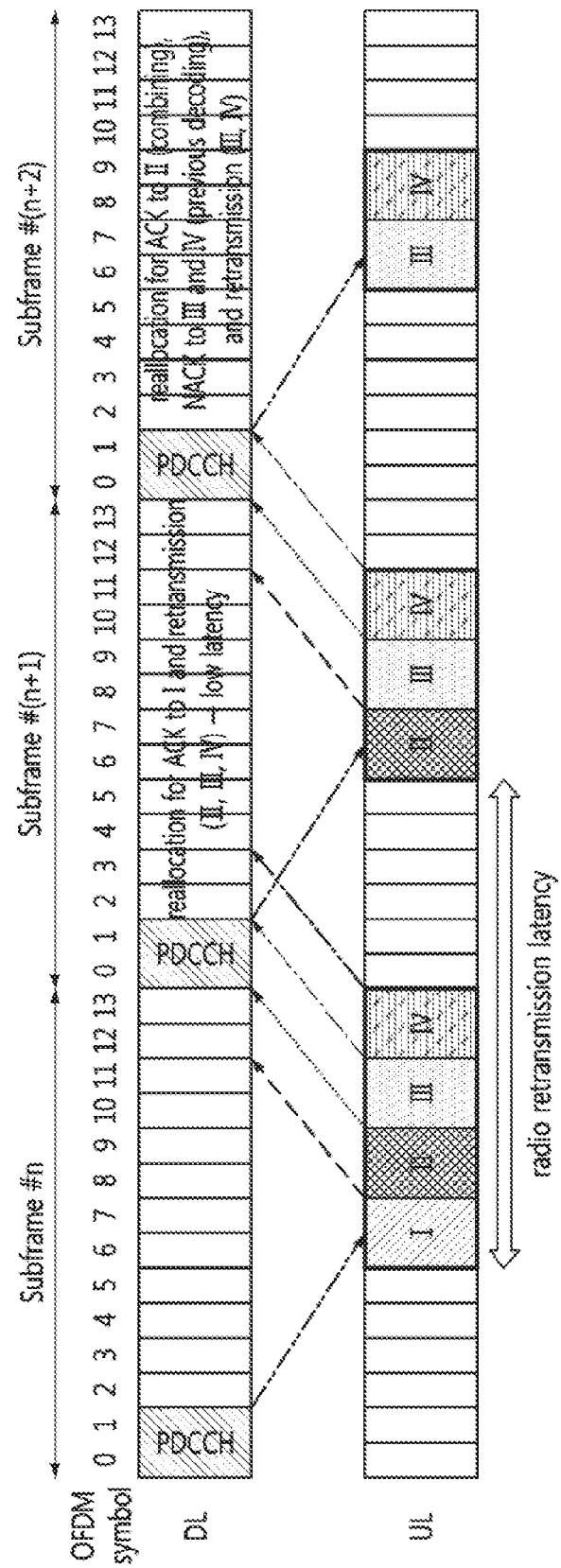
FIG. 26 is a timing diagram illustrating a fourteenth exemplary embodiment of a method for redundantly transmitting data in a communication system.

FIG. 26 is a timing diagram illustrating a fourteenth exemplary embodiment of a method for redundant transmitting data in a communication system.

Referring to FIG. 26, when a retransmission resource for initial data (e.g., data I to IV) transmitted in the subframe #n is previously allocated in the subframe #(n+1), and a downlink control channel including resource allocation information is received, the terminal may perform a data retransmission operation (e.g., reception operation of a downlink control channel including retransmission resource allocation information, retransmission operation of the data) based on the corresponding response allocation information (e.g., reallocation for the data I) in the subframe #(n+1).

The base station may transmit an HARQ response corresponding to the data I to the terminal in the subframe #(n+1), and transmit (re)allocation information for data (e.g., data II to IV) that have not been received at the base station in the subframe #(n+1). When the reallocation information for the data is not received from the base station instead of the HARQ response, the terminal may determine that the data has been successfully received at the base station. The base station may combine the current data with the previous data, perform a decoding operation on the data through combining, and determine necessity of (re)allocation or pre-allocation of a resource based on a result of the decoding operation. When the (re)allocation or pre-allocation of the resource is required, the base station may allocate the resource. Therefore, transmission latency can be reduced and reliability can be improved.

Figure 27:
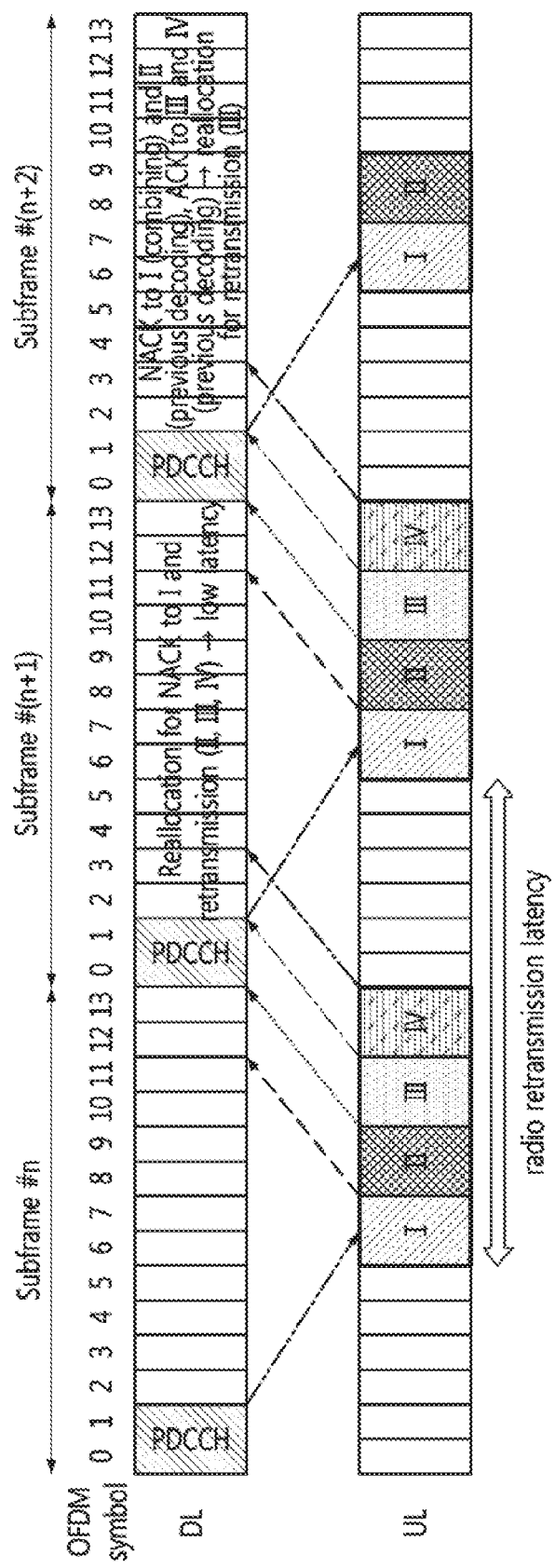
FIG. 27 is a timing diagram illustrating a fifteenth exemplary embodiment of a method for redundantly transmitting data in a communication system.

FIG. 27 is a timing diagram illustrating a fifteenth exemplary embodiment of a method for redundant transmitting data in a communication system.

Referring to FIG. 27, when data I is not successfully received at the base station, the base station may transmit at least one of NACK corresponding to the data I, reallocation information for the data I, and (re)allocation information for data that have not been received (e.g., data II to IV) in the subframe #(n+1). The terminal may receive one or more of NACK corresponding to the data I, the reallocation information for the data I, and the (re)allocation information for the data II to IV in the subframe #(n+1) through a PDCCH, and accordingly, the terminal may retransmit the data I to IV in the subframe #(n+1).

Figure 28:
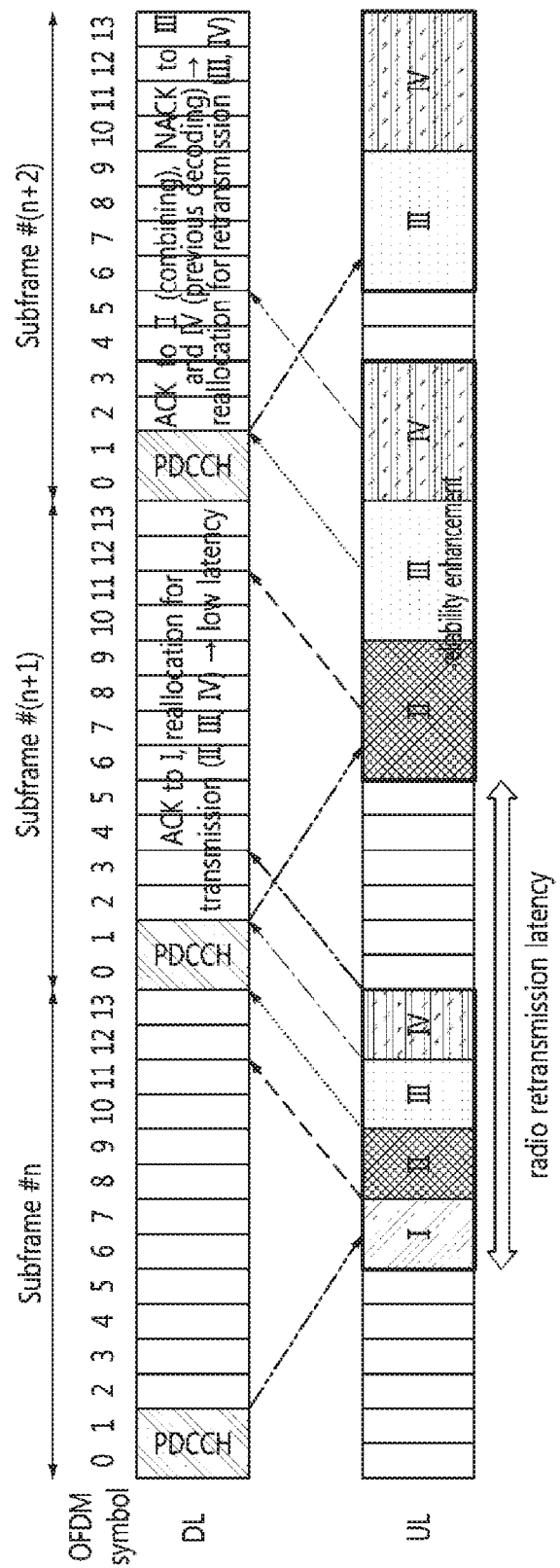
FIG. 28 is a timing diagram illustrating a sixteenth exemplary embodiment of a method for redundantly transmitting data in a communication system.

FIG. 28 is a timing diagram illustrating a sixteenth exemplary embodiment of a method for redundantly transmitting data in a communication system.

Referring to FIG. 28, when data I is successfully received at the base station, the base station may transmit ACK corresponding to the data I and NACK and/or (re)allocation information for the data that have not been received (e.g., data II to IV) in the subframe #(n+1). The terminal may receive one or more of ACK corresponding to the data I, NACK corresponding to the data I to IV, and the (re)allocation information in the subframe #(n+1) through a PDCCH, and accordingly, the terminal may retransmit the data II to IV. Also, the base station may skip ACK corresponding to the data I. That is, only when the data is not successfully received, the base station may transmit a feedback or data (re)allocation information to the terminal. When the uplink resource is reallocated or pre-allocated, a downlink control channel (PDCCH) including transmission characteristics different from transmission characteristics of the previous data (e.g., time and frequency resources, MCS, RV) may be transmitted.

Additionally, the terminal may transmit the data based on information indicating the number of repetitive transmissions, which is previously received from the base station. When the resource indicated by the previous resource allocation information overlaps with the resource indicated by the current resource allocation information, the terminal may transmit the data based on the current resource allocation information. That is, the previous resource allocation information may be overridden by the current resource allocation information. When data is successfully received from the terminal, resource reallocation or pre-allocation may not be required. In this case, the base station may terminate the repeated data allocation, and may transmit information indicating that the repeated data allocation has been terminated. The terminal may determine that the repeated data allocation has been terminated based on the information received from the base station, and may terminate the multiple resource allocation based thereon.

Alternatively, when the information indicating (re)allocation, change, or termination of the resource based on the preconfigured multiple resource allocation information is not received from the base station within a predetermined time, the terminal may determine that the multiple resource allocation information is invalid. The terminal may receive redundant transmission related information (e.g., information indicating allocation, change, and/or termination of multiple resources) from the base station, and transmit an HARQ response (e.g., ACK or NACK) corresponding to the redundant transmission related information to the base station. The base station may receive the HARQ response from the terminal, and may determine whether the redundant transmission related information has been successfully received at the terminal based on the HARQ response.

When ACK corresponding to the redundant transmission related information is not received, when NACK corresponding to the redundant transmission related information is received, or when the HARQ response corresponding to the redundant transmission related information is not received within a preconfigured time, the base station may determine that the redundant transmission related information has not been successfully received by the terminal. In this case, the base station may notify the terminal of the allocation, change, or termination of resources for redundant transmission by performing a retransmission procedure of the redundant transmission related information or a transmission procedure of new redundant transmission related information.

1.3 Multi-Transmission Method for Random Access (RA)
1.3.1 Random Access Procedure Latencies in a random access procedure may be defined as shown in Table 4 below.

TABLE 4

| Latency | Description | Terminal | Base station | Time [TTI] |
|---|---|---|---|---|
| T1 | Latency according to a (P)RACH scheduling period | X | | 0.5 |
| T2 | RAP transmission latency | X | | 1 |
| T3 | Processing latency according to RAP decoding | | X | N1 + L1 |
| T4 | Processing latency according to RAR (TA + UL grant) encoding | | X | |
| T5 | RAR transmission latency | | X | 1 |
| T6 | Processing latency according to RAR decoding | X | | N2 + L2 |
| T7 | Processing latency according to PUSCH encoding | X | | |
| T8 | PUSCH transmission latency | X | | 1 |
| | Overall latency | | | 3.5 + N1 + N2 + L1 + L2 |

T1, T2, T6, T7, and T8 may be latencies due to the operation performed at the terminal, and T3, T4, and T5 may be latencies due to the operation performed at the base station. T1 may be a time required for the terminal to acquire a physical random access channel (PRACH) to transmit a random access preamble (RAP) to the base station for random access. There may be a duration for one PRACH transmission within one TT. The transmission of the RAP may be performed within one TTI.

The base station may transmit a random access response (RAR) to the terminal in response to the RAP received from the terminal. T5 may be a time required for transmission of the RAR. The time required for the RAR transmission may be one TTI. A processing latency for the RAR transmission may be T3+T4. T3 may be a reception latency of the RAP, and T4 may be a transmission latency for generation of the RAR.

Further, the processing latency may include a latency in the L1 layer and a latency in the L2 layer. The latency In the L1 layer may be defined as 'N1,' and the latency in the L2 layer may be defined as 'L1.' The terminal may receive the RAR from the base station, and may determine whether the random access procedure is successful based on information included in the RAR. In addition, the terminal may obtain uplink resource allocation information from the RAR. The latency according to the decoding operation for the RAR (e.g., RAR reception operation, acquisition operation of information (e.g., timing advance (TA), uplink resource allocation information) included in the RAR) may be T6. T7 and T8 may be processing latencies for PUSCH transmission in the terminal. Here, the latency in the L1 layer may be defined as 'N2,' and the latency in the L2 layer may be defined as 'L2.'

Figure 29:
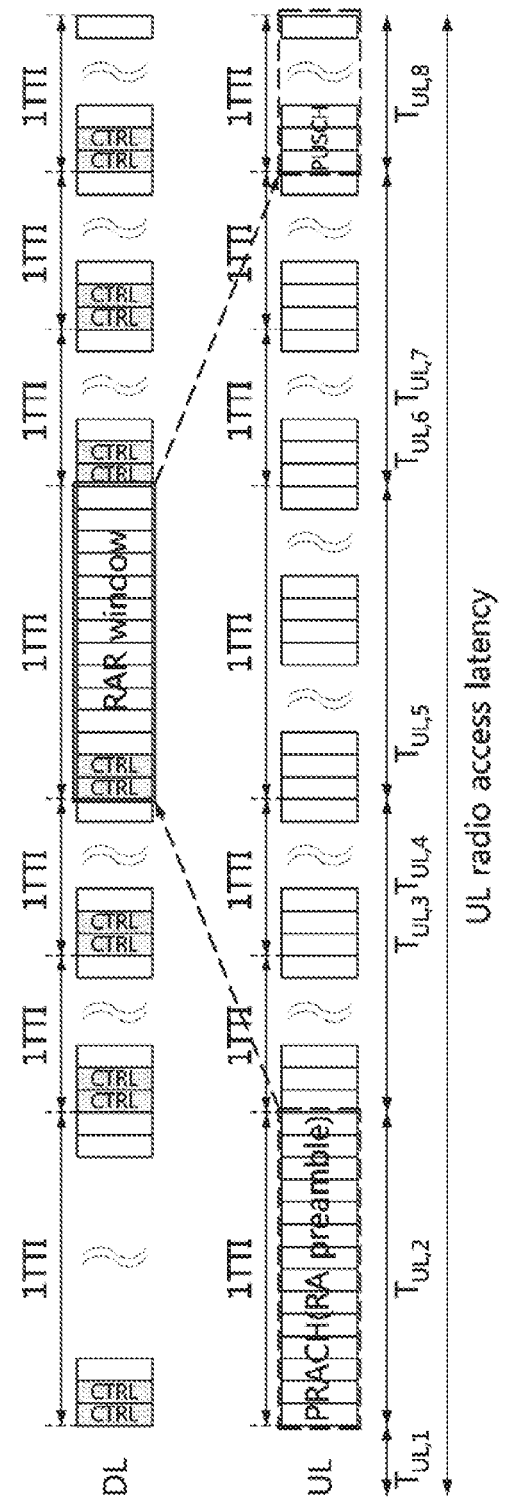
FIG. 29 is a timing diagram illustrating a first exemplary embodiment of a random access procedure in a communication system.

FIG. 29 is a timing diagram illustrating a first exemplary embodiment of a random access procedure in a communication system.

Referring to FIG. 29, each of $T_{UL,1}$ to $T_{UL,8}$ may correspond to each of T1 to T8 shown in Table 4. The terminal may transmit the RAP to the base station on the PRACH. The base station may receive the RAP from the terminal, and may transmit the RAR to the terminal in response to the RAP. When a plurality of terminals transmit the same RAP at the same time or when a radio channel state between the terminal and the base station is poor, the base station may not receive the RAP from the terminal. In this case, the base station may not transmit the RAR. When the RAR is not received from the base station within a preconfigured time (e.g., RAR window), the terminal may perform the random access procedure again by restarting the RAP transmission operation. In this case, a latency of 'T2+T3+T4+RAR window' may occur.

In addition, even though the RAR is transmitted from the base station, if the terminal does not successfully receive the RAR, the terminal may perform the random access procedure again by restarting the RAP transmission operation. That is, when the RAR is not received from the base station within the RAR window, the terminal may restart the RAP transmission operation. In this case, a latency of 'T2+T3+T4+T5+T6+RAR window' may occur.

In order to reduce 'T2+T3+T4+RAR window' or 'T2+T3+T4+T5+T6+RAR window,' multiple RAP/RAR transmission method may be applied as follows.

Figure 30:
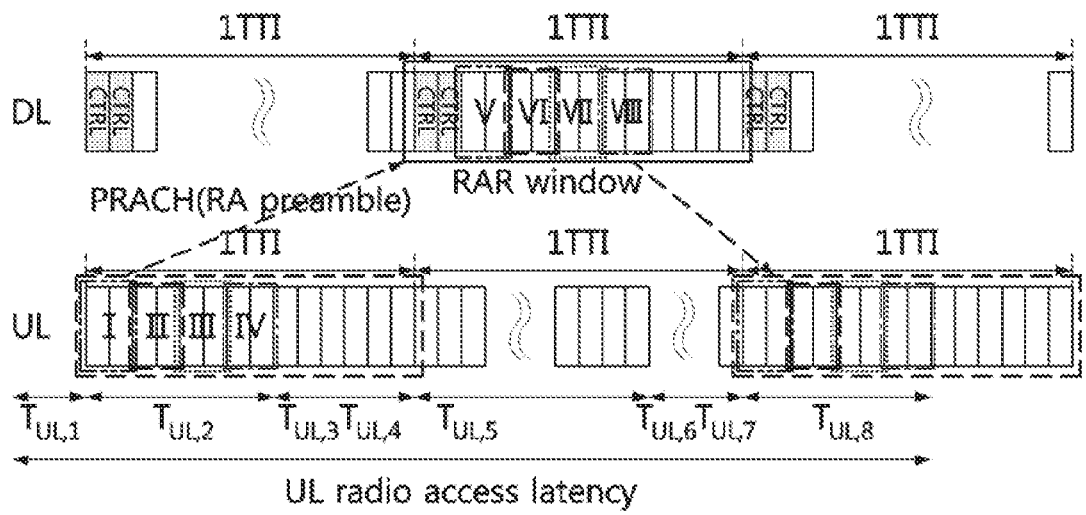
FIG. 30 is a timing diagram illustrating a second exemplary embodiment of a random access procedure in a communication system.

FIG. 30 is a timing diagram illustrating a second exemplary embodiment of a random access procedure in a communication system.

Referring to FIG. 30, the terminal may repeatedly transmit RAPs in durations I to IV within the PRACH. One RAP may be transmitted within one duration, and the same RAP or different RAPs may be repeatedly transmitted in the durations I to IV. One duration may consist of n symbols, a mini-slot, a slot, or a subframe. Here, n may be an integer equal to or greater than 1. The RAPs may be repeatedly transmitted at the same interval within the PRACH. Alternatively, the RAPs may be continuously transmitted within the PRACH. Alternatively, the RAPs may be repeatedly transmitted in arbitrary durations within the PRACH.

The base station may receive the RAP from the terminal, and may transmit the RAR to the terminal in response to the RAP. The RAR may include an RAPID used for identifying the RAP received from the terminal. Alternatively, the RAR may not include the RAPID used for identifying the RAP received from the terminal. The RAR may be repeatedly transmitted in durations V to VIII. One RAR may be transmitted in one duration, and the same RAR or different RARs may be repeatedly transmitted in the durations V to VIII. One duration may consist of n symbols, a mini-slot, a slot, or a subframe. n may be an integer equal to or greater than 1.

The base station may calculate a transmission time of the RAR in consideration of the processing latency according to the reception operation of the RAP and the transmission operation of the RAR, and may transmit the RAR to the terminal at the calculated transmission time. When all RAPs are successfully received, the base station may transmit to the terminal as many RARs as the number of received RAPs. Therefore, the terminal may receive a plurality of RARs from the base station. The base station may transmit the RAR including backoff related information, a TA, and an UL grant configured according to a situation of the terminal.

In order to instruct the terminal to transmit the RAP, the base station may transmit an RAR that does not include an UL grant. In this case, the RAR may include the backoff related information. TA, and the like. Alternatively, the RAR may not include information (e.g., RAPID) used for identifying the RAP received from the terminal. When the random access procedure is successfully performed, the RAR may not include the backoff related information. TA, and the like. In this case, the RAR may include information (e.g., RAPID) used for identifying the RAP received from the terminal. In order to indicate to the terminal that the random access procedure has been successfully performed, a cyclic redundancy check (CRC) value of the RAR may be scrambled by a predetermined RNTI (e.g., random access (RA)-RNTI).

When the previous RAR includes backoff related information, TA, etc., and the current RAR indicates that the random access procedure has been successfully performed, the terminal may skip or stop the RAP retransmission operation based on the information included in the previous RAR. When the RAR includes an UL grant, the terminal may transmit uplink data after 'T6+T7' from the reception time of the UL grant.

When it is required to identify whether the RAR (e.g., RAR including RAPID without UL grant) has been successfully received at the terminal or when it is required to provide a reliable data service, the terminal may transmit an HARQ for the RAR to the base station. This scheme may be applied usefully to a scenario in which the RAR (e.g., PDSCH having an UE contention resolution ID) is received at a time when reception of an UL grant is expected (e.g., scenario of receiving an RAR including a temporary cell (TC)-RNTI). To this end, the terminal may transmit the HARQ response (e.g., HARQ response corresponding to the RAR) to the base station on a PUCCH. In addition, the base station may transmit the RAR including information (e.g., time and frequency resources, MCS, etc.) necessary for transmission of the HARQ response corresponding to the RAR. The RAR may be transmitted within the RAR window shown in FIG. 30.

Figure 31:
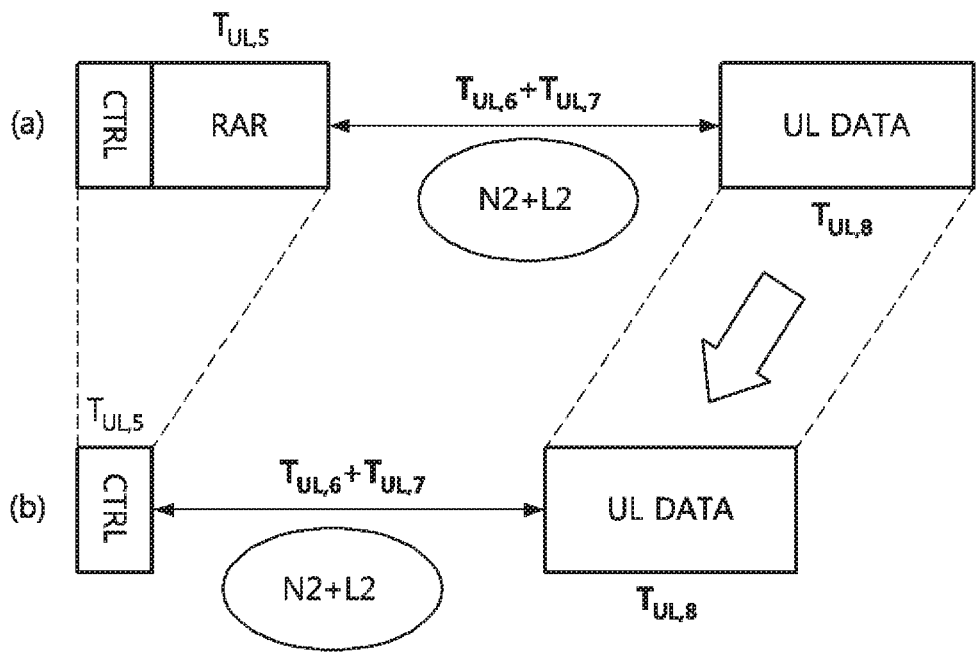
FIG. 31 is a timing diagram illustrating a first exemplary embodiment of a method for allocating an uplink resource in a communication system.

FIG. 31 is a timing diagram illustrating a first exemplary embodiment of a method for allocating an uplink resource in a communication system.

In the exemplary embodiment shown in (a) of FIG. 31, an RAR including an UL grant for PUSCH transmission may be transmitted on a downlink data channel. The PUSCH (e.g., UL data) may be transmitted after 'T6 ($T_{UL,6}$)+T7 ($T_{UL,7}$)' from the reception time of the RAR. The RAR including the UL grant may be included in the downlink data channel. In the uplink transmission procedure, the base station may transmit the RAR including the UL grant through the downlink data channel, and the terminal may receive the downlink data channel to obtain the UL grant, whereby a latency may occur.

In order to reduce the latency, in the exemplary embodiment illustrated in (b) of FIG. 31, the UL grant may be included in a downlink control channel instead of the downlink data channel. In this case, the operation of transmitting and receiving the downlink data channel may be omitted in the uplink transmission procedure. Therefore, $T_{UL,5}$ in the exemplary embodiment illustrated in (b) of FIG. 31 may be shorter than $T_{UL,5}$ in the exemplary embodiment illustrated in (a) of FIG. 31. In addition, data transmission may be prepared by the L1 layer in advance separately from the latency L2 in the L2 layer. In this case, the data may be transmitted after N2, whereby the latency can be reduced. A time required for the HARQ response corresponding to the RAR may be defined as a preconfigure time or a time corresponding to a first arriving PUCCH after a preconfigured time, not N1 and N2 shown in FIG. 7 and Table 3. The terminal may transmit the HARQ response corresponding to the RAR to the base station at the defined time.

1.3.2 Method for Managing Identifier and Parameter Related to Random Access

In order to perform the random access procedure described in '1.3.1.' the base station may transmit the RAR to the terminal in response to the RAP received from the terminal. The base station may generate a downlink control channel (e.g., PDCCH) based on the information (e.g., RA-RNTI) used for identifying the RAP, and the downlink control channel may indicate RAR transmission information. The RA-RNTI may be calculated using information on a resource including a PRACH (e.g., first slot number within a system frame number including the PRACH OFDM symbol index, frequency axis resource information, UL carrier information, etc.). For example, the RA-RNTI may be calculated based on Equation 1 below.

$$\text{RA-RNTI}=1+s\_id+14*t\_id+14*80*f\_id+14*80*8*\text{ul\_carrier\_id} \quad \text{[Equation 1]}$$

s_id: index of the first OFDM symbol within a specific PRACH (0≤s_id<14)

t_id: index of the first slot within a specific PRACH within a system frame (0≤t_id<80)

f_id: index of a specific PRACH in the frequency domain (0≤f_id<8)

ul_carrier_id: UL carrier used for transmission of MSG1 (e.g., PRACH) (0: conventional UL carrier, 1: supplementary UL (SUL) carrier)

In particular, Equation 1 may be usefully applied to a scenario in which one RAP is transmitted, as shown in the exemplary embodiment illustrated in FIG. 29. When a plurality of RAPs are transmitted within a specific duration (e.g., PRACH), definition for configuring/calculating the RA-RNTI is required.

In the first method, s_id, t_id, f_id, and ul_carrier_id of Equation 1 may be determined based on the RAP (e.g., MSG1) instead of the PRACH to distinguish each of a plurality of RAPs because the plurality of RAPs are transmitted within a specific duration (e.g., PRACH). In this case, s_id, t_id, f_id, and ul_carrier_id may be defined as follows.

s_id: index of the first OFDM symbol used for MSG1 transmission within a specific PRACH (0≤s_id<14)

t_id: index of the first slot used for MSG1 transmission within a specific PRACH within a system frame (0≤t_id<80)

f_id: index used for MSG1 transmission within a specific PRACH in the frequency domain (0≤f_id<8)

ul_carrier_id: UL carrier used for MSG1 transmission (0: conventional UL carrier, 1: SUL carrier)

In the second method, the same RA-RNTI may be calculated irrespective of the difference in time and frequency resources in which a plurality of RAPs are transmitted. For example, the RA-RNTI may be calculated based on the first RAP among a plurality of RAPs transmitted within a preconfigured time.

When a plurality of RAPs are transmitted within one subframe (e.g., RAP window) composed of 14 OFDM symbols, Equation 2 below may be defined. Here, one RAP may be transmitted through n OFDM symbols. n may be an integer equal to or greater than 1.

$$T_{RAP}: \text{Number of } OFDM \text{ symbols used for } RAP \text{ transmission}$$

$$T_{RAP}(\text{e.g., } 2, 4, 7, 14 \text{ } OFDM \text{ symbols}) \leq T_{window}(\text{e.g., } 14 \text{ } OFDM \text{ symbols})$$

$$N_{RAP}: \text{Number of } RAP \text{ transmissions within } RAP \text{ window (units of } T_{RAP})$$

$$1 \leq N_{RAP} \leq \left\lfloor \frac{T_{window}}{T_{RAP}} \right\rfloor \quad \text{[Equation 2]}$$

The RAPs may be transmitted at an arbitrary interval within the $T_{window}$, and the RAPs as many as $N_{RAP}$ may be transmitted. Here, $\lfloor x \rfloor$ may mean the largest integer less than or equal to x, and s_id may be calculated based on Equation 3 below.

$$s\_id \in \left\{ 0, T_{RAP}, \ldots, T_{RAP} \times \left( \left\lfloor \frac{T_{window}}{T_{RAP}} \right\rfloor - 1 \right) \right\} \quad \text{[Equation 3]}$$

Meanwhile, when a plurality of RARs are transmitted as in the exemplary embodiment illustrated in FIG. 30, the RAR transmitted through a downlink data channel may be indicated by a downlink control channel. Equation 4 below may be defined, and $T_{RAR}$ and $N_{RAR}$ may be included in the downlink control channel indicating the RAR. Alternatively, the RAR transmission/reception procedure may be performed using preconfigured values.

$$T_{RAR}: \text{Number of } OFDM \text{ symbols used for } RAR \text{ transmission}$$

$$T_{RAR}(\text{e.g., } 2, 4, 7, 14 \text{ } OFDM \text{ symbols}) \leq$$

$$RAR_{window}(\text{e.g., } 1, 2, 4, 8, 10, 20, 40, 80 \text{ slots; one slot is composed of } 1 \sim 14 \text{ } OFDM \text{ symbols})$$

$$N_{RAR}: \text{Number of } RAR \text{ transmissions within } RAR \text{ window (units of } T_{RAR})$$

$$1 \leq N_{RAR} \leq \left\lfloor \frac{RAR_{window}}{T_{RAR}} \right\rfloor \quad \text{[Equation 4]}$$

Here, the RAR may be transmitted on the first downlink data/control channel after T3 for the first received RAP and T4 for the RAR. One RAR may be transmitted within the RAR window. Alternatively, $N_{RAR}$ RARs may be transmitted within the RAR window. The RAR may be transmitted at an arbitrary point within the RAR window. The RARs may be transmitted at a regular interval (e.g., $I_{RAR}$) within the RAR window. Alternatively, the RARs may be continuously transmitted within the RAR window. As described in '1.3.1,' the base station may transmit the RAR including the backoff related information (e.g., backoff indicator (BI)), TA. UL grant, and the like.

That is, the base station may inform the terminal of resources for uplink data by transmitting the RAR. In addition, the base station may indicate RAP retransmission through transmission power ramping and backoff by transmitting the RAR. In this case, the terminal may perform an operation (e.g., transmission power adjustment, backoff, or uplink data transmission) based on information received initially from the base station. Alternatively, the terminal may perform an independent operation based on each information included in the RAR. Additionally, the base station may transmit configuration information (e.g., the number of repetitive transmissions, resource allocation information, etc.) for retransmission RAP or retransmission data to the terminal. In particular, according to the exemplary embodiment of '1.2,' two or more MSG3s may be transmitted.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method performed by a terminal in a communication system, the operation method comprising:
   transmitting a random access message to a base station;
   receiving, from the base station, a random access response (RAR) in response to the random access message within a window;
   determining that a random access procedure is successfully performed when the RAR includes a random access preamble identifier (RAPID) of the random access message without backoff related information which is used for retransmitting the random access message;
   determining a transmission timing of a hybrid automatic repeat request (HARQ) response in response to the RAR based on information indicating physical resources used for transmitting the HARQ response included in the RAR and a preconfigured value which is determined by the terminal; and
   transmitting, to the base station, the HARQ response in response to the RAR in a physical uplink control channel (PUCCH) at the transmission timing,
   wherein the HARQ response in response to the RAR is transmitted when the RAR includes the RAPID without an uplink grant.

2. The operation method of claim 1, wherein the physical resources includes a time resource and a frequency resource used for transmitting the HARQ response in response to the RAR.

3. The operation method of claim 1, further comprising receiving, from the base station, downlink control information (DCI) which includes information indicating resources used for transmitting the RAR, wherein a cyclic redundancy check (CRC) of the DCI is scrambled by a random access-radio network temporary identifier (RA-RNTI).

4. An operation method performed by a base station, the operation method comprising:
- receiving a random access message from a terminal;
- generating a random access response (RAR) including a random access preamble identifier (RAPID) of the random access message and information indicating physical resources used for transmitting a hybrid automatic repeat request (HARQ) response in response to the RAR without backoff related information which is used for retransmitting the random access message when a random access procedure is successfully performed;
- transmitting the RAR in response to the random access message to the terminal;
- determining a reception timing of the HARQ response in response to the RAR based on the information included in the RAR and a preconfigured value which is determined by the base station; and
- receiving, from the terminal, the HARQ response in response to the RAR in a physical uplink control channel (PUCCH) at the reception timing,
- wherein the HARQ response in response to the RAR is received when the RAR includes the RAPID without an uplink grant.

5. The operation method of claim 4, wherein the physical resources includes a time resource and a frequency resource used for transmitting the HARQ response in response to the RAR.

6. The operation method of claim 4, further comprising transmitting, to the terminal, downlink control information (DCI) which includes information indicating resources used for transmitting the RAR, wherein a cyclic redundancy check (CRC) of the DCI is scrambled by a random access-radio network temporary identifier (RA-RNTI).

7. The operation method of claim 4, wherein the RAR is repeatedly transmitted in a preconfigured period from the base station.

* * * * *